United States Patent
Josan et al.

(10) Patent No.: US 11,317,410 B2
(45) Date of Patent: Apr. 26, 2022

(54) BEAM MANAGEMENT ON A DEACTIVATED CELL

(71) Applicant: QUALCOMM Incorporated, San Diego, CA (US)

(72) Inventors: Awlok Singh Josan, San Francisco, CA (US); Valentin Alexandru Gheorghiu, Tokyo (JP); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/785,057

(22) Filed: Feb. 7, 2020

(65) Prior Publication Data

US 2020/0267711 A1    Aug. 20, 2020

Related U.S. Application Data

(60) Provisional application No. 62/806,711, filed on Feb. 15, 2019.

(51) Int. Cl.
*H04W 72/04*    (2009.01)
*H04W 24/08*    (2009.01)
(Continued)

(52) U.S. Cl.
CPC ......... *H04W 72/046* (2013.01); *H04W 16/28* (2013.01); *H04W 24/08* (2013.01);
(Continued)

(58) Field of Classification Search
CPC ... H04W 72/046; H04W 16/28; H04W 24/08; H04W 24/10; H04W 72/085;
(Continued)

(56) References Cited

U.S. PATENT DOCUMENTS

2018/0048413 A1*  2/2018  Liu ................. H04W 48/18
2018/0219606 A1*  8/2018  Ng .................. H04W 72/0453
(Continued)

FOREIGN PATENT DOCUMENTS

AU      2017284729 A1    1/2019

OTHER PUBLICATIONS

Qualcomm Incorporated: "Definition of known cell in Fr2", 3GPP Draft; R4-1803045 Definition of Known Cell in FR2, 3rd Generation Partnership Project (3GPP), Mobile Competence Centre; vol. RAN WG4, no. Athens, Greece, Feb. 19, 2018, XP051403063 (Year: 2018).*

(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. A user equipment (UE) may receive a configuration for a cell from a base station. In some examples, the cell may be deactivated and the base station may configure the cell with one or more base station beams. The UE may receive beam management resources for performing beam management based on the configured base station beams. In some examples, the beam management resources include resources for transmitting or receiving one or more reports indicating a quality of the configured base station beams. The UE may then perform the beam management, while the cell is deactivated, to track one or more UE beams corresponding to the configured base station beams.

30 Claims, 16 Drawing Sheets

(51) Int. Cl.
   *H04W 24/10* (2009.01)
   *H04W 16/28* (2009.01)
   *H04W 72/08* (2009.01)
   *H04W 36/00* (2009.01)

(52) U.S. Cl.
   CPC ......... *H04W 24/10* (2013.01); *H04W 72/085* (2013.01); *H04W 36/0005* (2013.01)

(58) Field of Classification Search
   CPC . H04W 36/0005; H04W 48/20; H04W 36/00; H04W 72/0453; H04W 48/12; H04W 48/18; H04L 27/2602; H04L 1/0026; H04L 5/0053; H04L 5/0032; H04L 5/00; G01S 5/14; H04B 7/088
   See application file for complete search history.

(56) References Cited

U.S. PATENT DOCUMENTS

| | | | | |
|---|---|---|---|---|
| 2019/0261425 | A1* | 8/2019 | Park | H04L 1/0026 |
| 2019/0319686 | A1* | 10/2019 | Chen, IV | H04B 7/088 |
| 2019/0386797 | A1* | 12/2019 | Yang | H04L 5/0032 |
| 2020/0068420 | A1* | 2/2020 | Chen | H04W 48/12 |
| 2020/0128423 | A1* | 4/2020 | Zhang | H04L 5/00 |
| 2020/0169336 | A1* | 5/2020 | Modarres Razavi | G01S 5/14 |

OTHER PUBLICATIONS

International Search Report and Written Opinion—PCT/US2020/017551—ISA/EPO—dated May 15, 2020.

LG Electronics: "Discussion on PowerSaving for CA Operation", 3GPP Draft; R1-1812591 CA, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, Nov. 11, 2018 (Nov. 11, 2018), XP051554535, 3 pages, Retrieved from the Internet: URL: http://www.3gpp.org/ftp/Meetings%5F3GPP%5FSYNC/RAN1/Docs/R1%2D1812591%2Ezip [retrieved on Nov. 11, 2018].

Qualcomm Incorporated: "Definition of Known Cell in FR2", 3GPP Draft; R4-1803045 Defintion of Known Cell in FR2, 3rd Generation Partnership Project (3GPP), Mobile Competence Centre; 650, Route Des Lucioles; F-06921 Sophia-Antipolis Cedex; France, vol. RAN WG4, No. Athens, Greece; Feb. 19, 2018 (Feb. 19, 2018), XP051403063, 2 pages, Retrieved from the Internet: URL:http://www.3gpp.org/ftp/tsg%5Fran/WG4%5FRadio/TSGR4%5F86/Docs/ [retrieved on Feb. 19, 2018].

* cited by examiner

BEAM MANAGEMENT ON A DEACTIVATED CELL

CROSS REFERENCE

The present Application for Patent claims the benefit of U.S. Provisional Patent Application No. 62/806,711 by JOSAN et al., entitled "BEAM MANAGEMENT ON A DEACTIVATED CELL," filed Feb. 15, 2019, assigned to the assignee hereof, and expressly incorporated herein.

BACKGROUND

The following relates generally to wireless communications, and more specifically to beam management on a deactivated cell.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., systems supporting millimeter wave (mmW) communications), beamforming may be used in order to overcome the relatively high path losses associated with frequencies in these systems. In order to support beamformed transmissions, communicating wireless devices (e.g., a base station and UE) may be operable to discover and maintain suitable beams for a given communication link. Improvements to reduce latency in such wireless communication systems supporting beamformed transmissions may be desired.

SUMMARY

The described techniques relate to improved methods, systems, devices, and apparatuses that support beam management on a deactivated cell. In some cases, beam management may include one or more of beam sweeping, beam measurement, beam determination, beam reporting, or any combination thereof. Generally, the described techniques provide for, a user equipment (UE) receiving a configuration for a cell from a base station. In some examples, the base station may configure the cell with one or more base station beams. In one example, the cell may be deactivated. In some cases, the cell may be a secondary cell. The UE may receive an indication that the cell is initially deactivated. In some cases, receiving the indication may be simultaneous with receiving the configuration for the cell or prior to receiving the configuration for the cell. In some examples, the UE may receive beam management resources for performing beam management based on the configured base station beams. In some examples, the beam management resources include resources for transmitting or receiving one or more reports indicating a quality of the configured base station beams. The UE may then perform beam management to track one or more UE beams corresponding to the configured base station beams. The UE may transmit to the base station, on an active cell and while the cell is deactivated, a measurement report corresponding to beam management at the UE.

DETAILED DESCRIPTION

Some wireless communications systems may employ beamforming in order to overcome communication range limitations that result from relatively high path losses associated with frequencies in the system. In existing wireless communications systems, if a base station deactivates a cell, then a user equipment (UE) may cease tracking one or more base station beams associated with that cell. Additionally, if the UE rotates or changes receiving angle, then the UE may lose timing synchronization for the deactivated cell. This may increase latency in reconnecting with the previously deactivated cell. To improve latency in such beamformed communications, the UE may be configured to perform beam management on a deactivated cell. For example, the UE may be configured to track one or more UE beams that correspond to one or more base station beams for the deactivated cell. In some cases, the deactivated cell may be a secondary cell.

According to one or more aspects of the present disclosure, the UE may receive a configuration for a first cell from the base station. The base station may configure the first cell with one or more base station beams. In some cases, the base station may configure a second cell with one or more base station beams. The base station may indicate the base station beams used to configure each cell. In one example, the first cell may be deactivated and the second cell may remain active. In some examples, the UE may receive beam management resources for performing beam management based on the configured base station beams. In some examples, the beam management resources include resources for transmitting or receiving one or more reports indicating a quality of the configured base station beams. For example, the UE may receive beam management resources for performing beam management for one or more base station beams corresponding to the deactivated first cell, and one or more beams corresponding to the active second cell. The UE may then perform beam management to track one or more UE beams corresponding to the configured base station beams. The UE may thus, track one or more base station beams that configures the deactivated first cell. Accordingly, the techniques described in the present disclosure may provide for decreasing the latency in the process of reconnecting with an initially deactivated secondary cell.

Aspects of the disclosure are initially described in the context of a wireless communications system. Aspects of the disclosure are further illustrated by and described with reference to apparatus diagrams, system diagrams, and flowcharts that relate to beam management on a deactivated cell.

Figure 1:
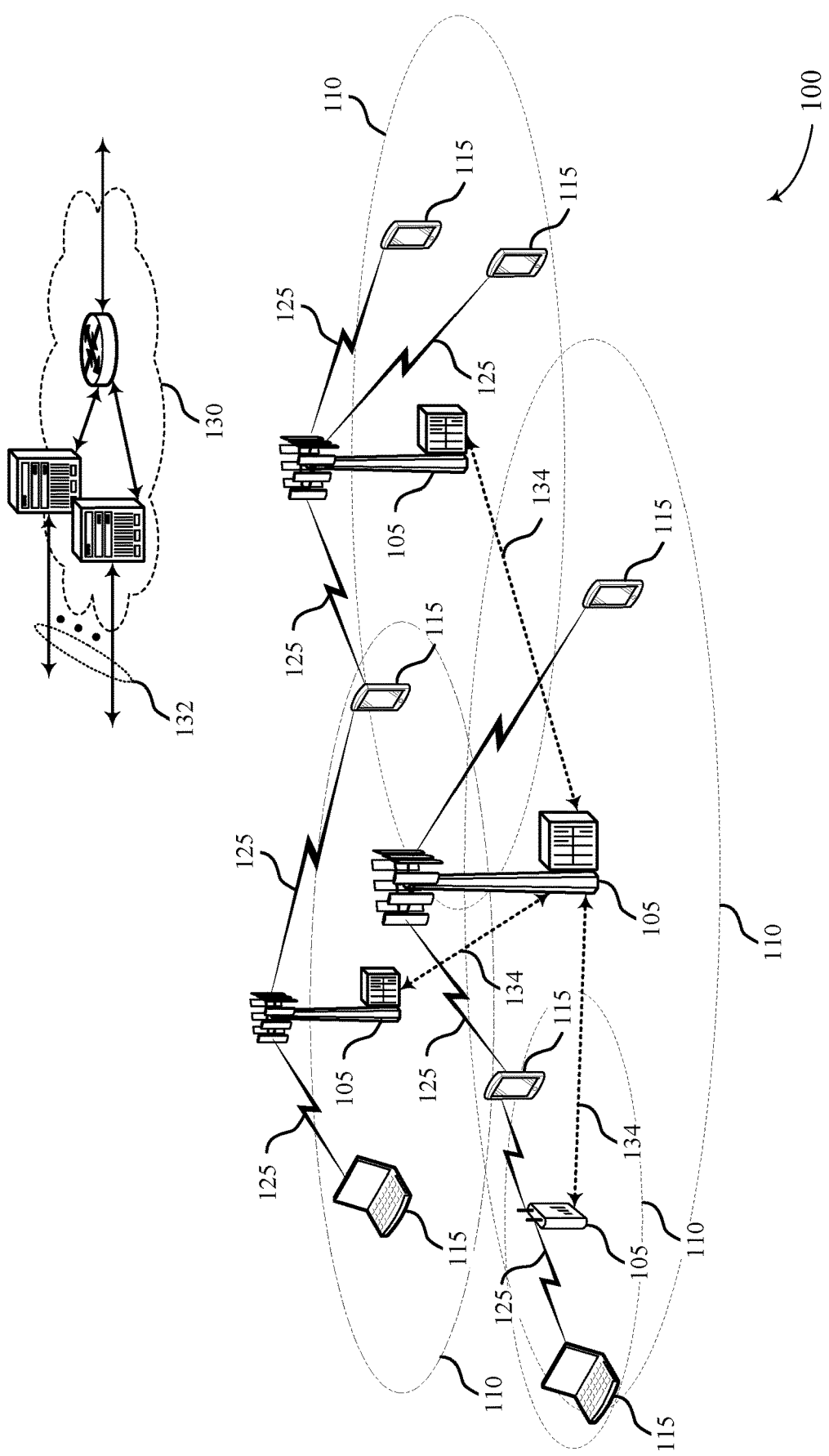
FIG. 1 illustrates an example of a system for wireless communications that supports beam management on a deactivated cell in accordance with aspects of the present disclosure.

FIG. 1 illustrates an example of a wireless communications system 100 that supports beam management on a deactivated cell in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in some examples, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals, system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In existing wireless communications systems, if a base station deactivates a cell, then a UE may cease tracking one or more base station beams associated with that cell. Additionally, if the UE rotates or changes receiving angle, then the UE may lose timing synchronization for the deactivated cell. This may increase latency in reconnecting with a previously deactivated cell. According to one or more aspects of the present disclosure, to improve latency in such beamformed communications, the UE 115 may be configured to perform beam management on a deactivated cell. For example, the UE 115 may be configured to track one or more UE beams that correspond to one or more base station beams for a deactivated cell. In some cases, the deactivated cell may be a secondary cell.

According to one or more aspects of the present disclosure, the UE 115 may receive a configuration for a cell from the base station 105. The base station 105 may configure the cell with one or more base station beams. In one example, the cell may be deactivated. In some examples, the UE 115 may receive an indication that the cell is initially deactivated. In some cases, receiving the indication may be simultaneous with receiving the configuration for the cell or prior to receiving the configuration for the cell. In some examples, the UE 115 may receive beam management resources for performing beam management based on the configured base station beams. In some examples, the beam management resources include resources for transmitting or receiving one or more reports indicating a quality of the configured base station beams. The UE 115 may then perform beam management to track one or more UE beams corresponding to the configured base station beams. The UE 115 may then transmit, on an active cell and while the cell is deactivated, a measurement report corresponding to beam management at the UE 115.

Figure 2:
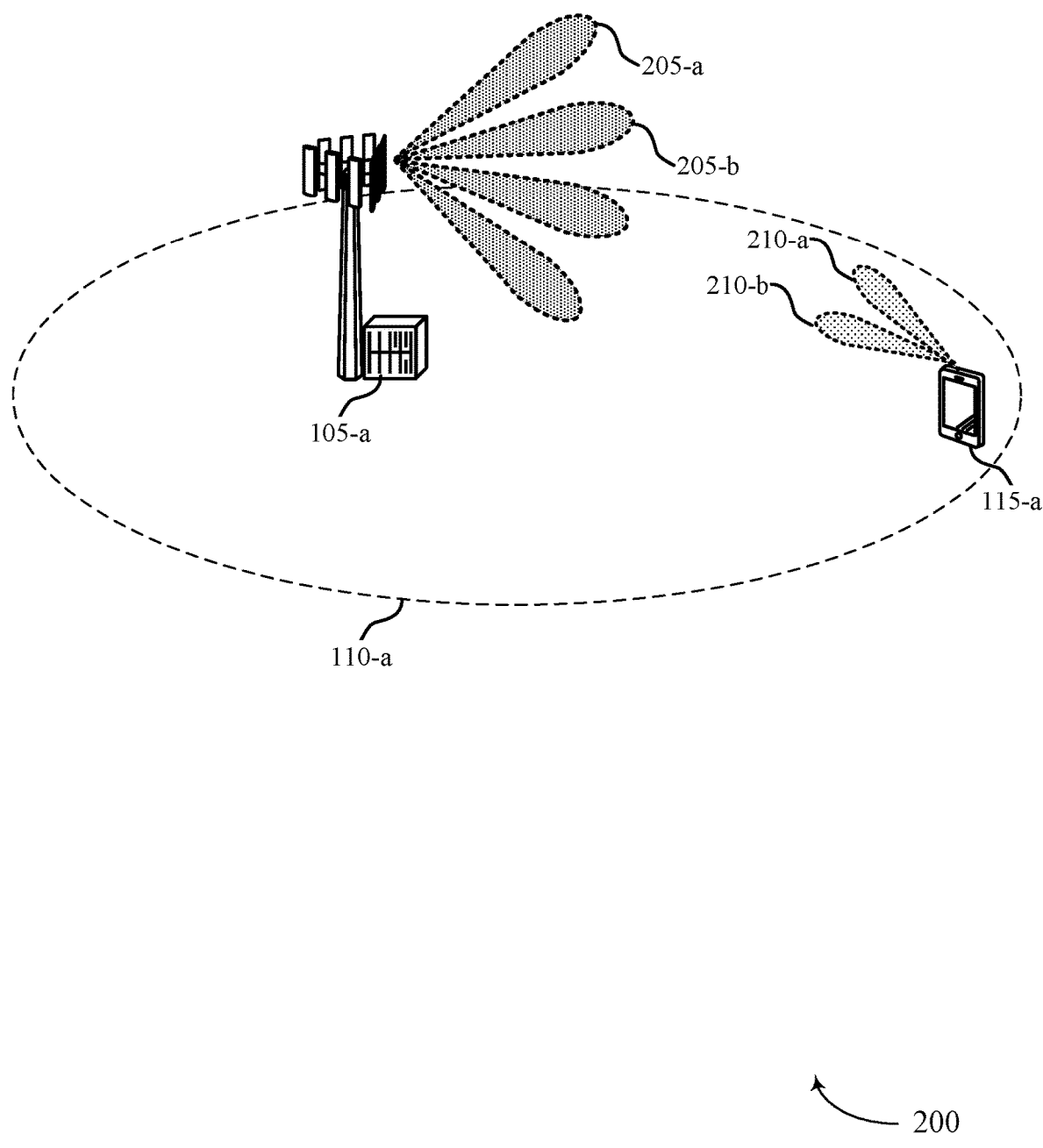
FIG. 2 illustrates an example of a wireless communications system that supports beam management on a deactivated cell in accordance with aspects of the present disclosure.

FIG. 2 illustrates an example of a wireless communications system 200 that supports beam management on a deactivated cell in accordance with aspects of the present disclosure. In some examples, the wireless communications system 200 may implement aspects of wireless communications system 100. The wireless communications system 200 includes a base station 105-a and a UE 115-a, each of which may be an example of the corresponding device described with reference to FIG. 1. Base station 105-a and UE 115-a may communicate using one or more directional beams. In the wireless communications system 200, a transmitter (e.g., base station 105-a) and a receiver (e.g., UE 115-a) may perform beam management operations. For example, the transmitter (e.g., base station 105-a) may engage in a beam sweeping operation to establish an active transmit beam with a receiver (e.g., UE 115-a), or beam tracking to maintain a connection with the receiver (e.g., UE 115-a).

As described in the example of FIG. 2, the wireless communications system 200 may operate in mmW frequency ranges (e.g., FR2 ranges). Such frequency ranges may be associated with beamformed transmissions between the base station 105-a and the UE 115-a. For example, the wireless communications system 200 may use signal processing techniques, such as beamforming to combine energy coherently and overcome path losses.

In some wireless communications systems, a base station 105-a may include multiple antennas. In some cases, each antenna may transmit a phase-shifted version of a signal such that the phase-shifted versions constructively interfere in some regions and destructively interfere in others. In some cases, weights may be applied to the various phase-shifted versions, e.g., in order to steer the transmissions in a desired direction. Such techniques may serve to increase the coverage area 110-a of the base station 105-a or otherwise benefit the wireless communications system 200. Transmit beams 205-a and 205-b represent examples of beams over which information may be transmitted. In some cases, the transmit beams 205-a and 205-b may also be referred to as base station beams. According to one or more aspects of the present disclosure, a first base station beam 205-a may be associated with a first cell and a second base station beam 205-b may be associated with a second cell. In some implementations, each transmit beam 205 may be directed from base station 105-a toward a different region of the coverage area 110-a and in some cases, two or more beams 205 may overlap. Transmit beams 205-a and 205-b may be transmitted simultaneously or at different times. In either case, a UE 115-a may be capable of receiving one or more transmit beams 205 via respective receive beams 210-a, 210-b. In some examples, the receive beams 210-a and 210-b may also be referred to as UE beams. According to one example, the UE 115-a may measure one or more base station beams 205 using the UE beams 210-a and 210-b.

In one example, UE 115-a may form one or more receive beams 210-a, 210-b (or UE beams). Similar to base station 105-a, UE 115-a may also include multiple antennas. The UE beams 210-a, 210-b may each correspond to one of the base station beams 205-a and 205-b (e.g., UE 115-a may be positioned within wireless communications systems 200 such that UE 115-a receives both beamformed transmit beams 205). In some cases, the UE 115-a may receive a subset of the base station beams 205. In some cases, the UE beams 210 (such as receive beams) may receive a single base station beam 205-*a* (e.g., UE beam 210-*a* may receive the base station beam 205-*a* with various pathloss and multipath effects included). That is, each antenna of UE 115-*a* may receive the base station beam 205-*a* which has experienced different path losses or phase shifts (e.g., different phase shifts may be due to the different path lengths between the base station 105-*a* and the respective antennas of the UE 115-*a*) and appropriately combine the received signals that is represented by receive beam 210. In some examples, base station 105-*a* may engage in a beam sweeping operation to establish an active transmit beam with UE 115-*a*. In some examples, base station 105-*a* may also engage in a beam tracking procedure to maintain a connection with UE 115-*a*. In some examples, the UE 115-*a* and the base station 105-*a* may perform a beam management operation, which may include beam selection (including beam sweeping and beam tracking), beam refinement, beam establishment, or a combination.

In wireless communications system 200 operating in mmW frequencies, a UE 115-*a* may perform beam management to track one or more UE beams 210 corresponding to one or more base station beams 205. In some cases, beam management may include one or more of maintaining a list of beams to track UE and/or base station beams, measuring one or more parameters (such as signal-to-noise ratios) of the signals transmitted or received on the beams in the list of beams, identifying one or more beams for communicating based on measuring the one or more parameters (such as based on an indication of a quality or strength of the measured beams), and reporting to a base station, an indication of quality or strength of the identified one or more beams. As described herein, the UE 115-*a* may identify a UE beam 210-*a* that corresponds to the base station beam 205-*a* (i.e., the UE beam 210-*a* receives highest power corresponding to the base station beam 205-*a*) and may identify a UE beam 210-*b* that corresponds to the base station beam 205-*b*. As previously discussed, the base station beam 205-*a* is associated with a first cell, and the base station beam 205-*b* is associated with a second cell. In existing wireless communications systems, if a base station deactivates a cell, then the UE may cease tracking the base station beams associated with that cell. For example, if the first cell is deactivated by the base station, then the UE may stop tracking the base station beam 205-*a*. Additionally, if the UE rotates or changes receiving angle, then the UE may lose timing synchronization for the first cell. This may increase latency in reconnecting if the base station activates the first cell. Thus, there exists a need for improved timing synchronization procedures for deactivated cells in wireless communications system (such as wireless communications system 200) operating in mmW frequencies.

To improve latency in the process of reconnecting with a deactivated cell, the UE may be configured to perform beam management on the deactivated cell. In some cases, beam management may include a beam sweeping operation to establish an active transmit beam with a receiver. Additionally or alternatively, the beam management procedure may include measuring the quality of a beam by measuring a signal-to-noise ratio, selecting a beam based on measurement of the beam, and transmitting or receiving one or more reports indicating a quality of a base station beam. For example, the UE may be configured to track the UE beam that corresponds to the base station beams for the deactivated cell. In some examples, the base station may provide beam management resources for performing beam management based on the configured base station beams (such as base station beams corresponding to active cells as well as inactive cells). In some cases, the deactivated cell may be a secondary cell (e.g., an SCell). Accordingly, the techniques described in the present disclosure may provide for decreasing the latency in the process of reconnecting with an initially deactivated secondary cell. In some examples, such reconnecting may be during a handover procedure or a cell activation procedure.

According to one or more aspects of the present disclosure, the UE 115-*a* may receive a configuration for a first cell from the base station 105-*a*. The base station 105-*a* may configure the first cell with a base station beam 205-*a*. Additionally, the base station 105-*a* may configure a second cell with a base station beam 205-*b*. The base station 105-*a* may indicate the base station beams 205 used to configure each cell. In one example, the first cell may be deactivated and the second cell may remain active. In some examples, the UE 115-*a* may receive an indication that the first cell is initially deactivated. In some cases, receiving the indication may be simultaneous with receiving the configuration for the first cell or prior to receiving the configuration for the first cell. In some examples, the UE 115-*a* may receive beam management resources for performing beam management based on the configured base station beams. In some examples, the beam management resources include resources for transmitting or receiving one or more reports indicating a quality of the configured base station beams. For example, the UE 115-*a* may receive beam management resources for performing beam management corresponding to the base station beam 205-*a* (such as one or more beams correspond to the deactivated first cell) and the base station beam 205-*b* (such as one or more beams correspond to the active second cell).

The UE 115-*a* may then perform beam management to track one or more UE beams corresponding to the configured base station beams. That is, the UE 115-*a* may utilize the beam management resources to perform beam management to track a first UE beam 210-*a* corresponding to the base station beam 205-*a* and beam management to track a second UE beam 210-*b* corresponding to the base station beam 205-*b*. In some implementations, the UE 115-*a* may track which of the UE beams 210 is best suited for communication with one or more of the configured base station beams 205 of the cell (such as deactivated cell). In some examples, the UE 115-*a* may determine which of the UE beams 210 is best suited for communication with one or more of the configured base station beams 205 of the deactivated cell based on performing measurement on the configured base station beams 205.

In some cases, the UE 115-*a* may perform beam management while the cell is deactivated. The UE 115-*a* may additionally determine whether the cell is a known cell. For example, if the UE 115-*a* determines that a deactivated cell is detectable using one or more UE beams, the UE 115-*a* may determine that the deactivated cell is a known cell. In some cases, the UE 115-*a* may store an indication of the known cell and the corresponding UE beams used to detect the configured base station beams for the deactivated cell. The UE 115-*a* may thus track the base station beam 205-*a* that configures the deactivated first cell. In some examples, beam management at the UE 115-*a* may include tracking and determining which UE beam is best suited for communication (e.g., based one or more measurement reports or other quality metrics) for each of the configured base station beams. Additionally, the UE 115-*a* may track the base station beam 205-*b* that configures the active second cell.

According to one or more aspects, the UE 115-*a* may also receive a second configuration for the base station beam 205-*a*. Specifically, the UE 115-*a* may initially receive one or more base station beams associated with a cell, and may additionally receive a configuration specific to the base station beams. In some cases, the UE 115-*a* may utilize the second configuration to periodically measure the configured base station beams by using the one or more UE beams. For example, the UE 115-*a* may determine the configuration associated with the base station beam 205-*a*. Upon determining the configuration, the UE 115-*a* may measure the base station beam 205-*a* using the UE beam 210-*a*. In this way, the UE 115-*a* may keep track of which UE beam corresponds to the base station beam 205-*a*. In some examples, the UE 115-*a* may transmit a measurement report including an indication of which of the configured base station beams are being measured. Additionally or alternatively, the UE 115-*a* may determine whether the cell remains detectable for a threshold time period. For example, the UE 115-*a* may measure a signal-to-noise ratio associated with each cell (such as the first cell and the second cell). Upon determining that the deactivated cell remains detectable for the threshold time period, the UE 115-*a* may determine whether the deactivated cell is a known cell. In some cases, determining that the deactivated cell is the known cell may be based on transmitting the measurement report and the cell being detectable for the threshold time period. Upon identifying the known beam, the UE 115-*a* may store an indication of the known beam used to detect the configured base station beams for the deactivated cell.

In some examples, the UE 115-*a* may determine that a deactivated cell is a known cell if it meets the following conditions: during a threshold time period (e.g., 80 ms), the UE 115-*a* has sent a valid measurement report for the cell; the cell remains detectable according to the cell identification conditions (e.g., signal to noise ratios or the like); and the UE has been configured with beam management resources (e.g., resources to measure reference signals) from the cell, as discussed above.

As described in the example of FIG. 2, the base station 105-*a* may indicate that the first cell is deactivated and the second cell is active. In such a case, the UE 115-*a* may receive a configuration for the active cell from the base station 105-*a*. In some cases, the active cell may include the second base station beam 205-*b*. The UE 115-*a* may identify that a second UE beam 210-*b* corresponds with the second base station beam 205-*b* for the active cell. Upon identifying a UE beam for an active cell, the UE 115-*a* may transmit the measurement reports associated with the deactivated cell using the second UE beam 210-*b*.

In some examples, the UE 115-*a* may receive an activation command corresponding to the deactivated cell from the base station 105-*a*. For example, the base station may indicate that the UE 115-*a* may activate the initially deactivated cell. In such case, the UE 115-*a* may determine the known beam (such as the stored UE beam 210-*a*) for the previously deactivated cell (or first cell) and may communicate with the base station 105-*a*, based on the stored indication of the UE beam 210-*a*. In some examples, receiving the activation command may be included in a handover procedure or a cell activation procedure.

Figure 3:
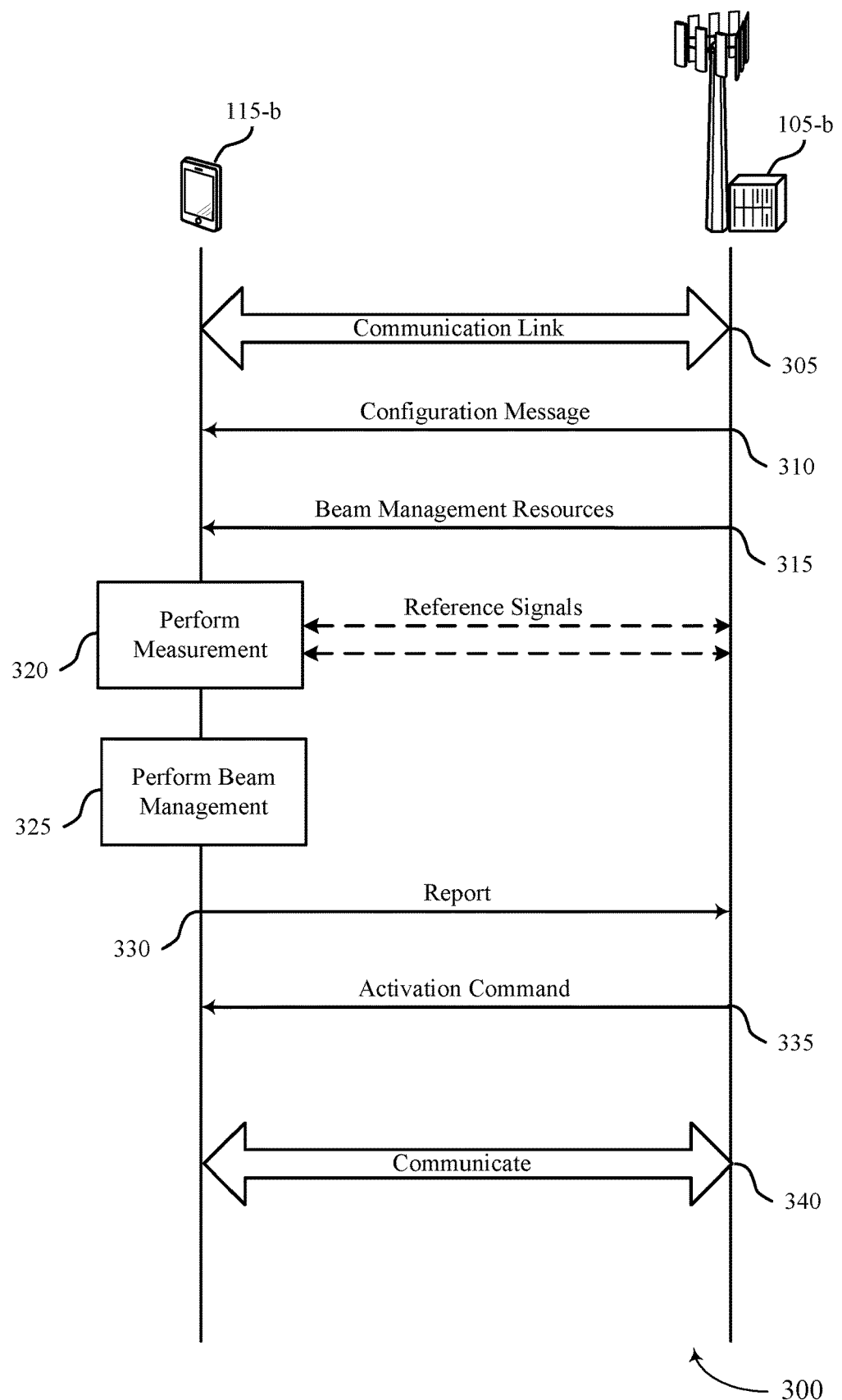
FIG. 3 illustrates an example of a process flow that supports beam management on a deactivated cell in accordance with aspects of the present disclosure.

FIG. 3 illustrates an example of a process flow 300 that supports beam management on a deactivated cell in accordance with aspects of the present disclosure. In some examples, process flow 300 may implement aspects of wireless communications system 100. The process flow 300 may include a base station 105-*b* and a UE 115-*b*, which may be examples of the corresponding devices described with reference to FIGS. 1 and 2. To improve latency in the process of reconnecting with a deactivated cell, the UE 115-*b* may be configured to perform beam management on the deactivated cell. Alternative examples of the following may be implemented, where some steps are performed in a different order than described or are not performed at all. In some cases, steps may include additional features not mentioned below, or further steps may be added.

At 305, the base station 105-*b* and the UE 115-*b* may establish a communication link (e.g., which may be an example of a communication link 125 as described with reference to FIG. 1). For example, the communication link at 305 may support beamformed communications.

At 310, the base station 105-*b* may transmit a configuration message to the UE 115-*b*. The configuration message may be associated with a cell. In some cases, using the configuration message, the base station 105-*b* may indicate the cell is deactivated and is configured with one or more base station beams. The configuration message may indicate beam management resources. In some examples, the UE 115-*b* may additionally receive an indication that the cell is initially deactivated, where receiving the indication is simultaneous with receiving the configuration for the cell or prior to receiving the configuration for the cell. In some examples, the cell is a secondary cell (e.g., an SCell). Additionally, the UE 115-*b* may receive a second configuration for a first base station beam of the configured base station beams.

At 315, the base station 105-*b* may transmit to the UE 115-*b*, an allocation of beam management resources for performing beam management based on the configured base station beams. In some cases, the beam management resources may include resources for the UE 115-*b* to receive and measure reference signals corresponding to the one or more configured base station beams. In some cases, the beam management resources may include resources for transmitting or receiving one or more reports indicating a quality of the configured base station beams.

At 320, the UE 115-*b* may measure the configured base station beams at the UE 115-*b* by using the one or more UE beams (e.g., by measuring the reference signals corresponding to the one or more configured base station beams). As depicted in the example of FIG. 3, the UE 115-*b* may optionally transmit and/or receive one or more reference signals from the base station 105-*b*. The UE 115-*b* transmit and/or receive one or more reference signals from the base station 105-*b* during or prior to performing the measurement.

In some examples, the UE 115-*b* may perform the measurements based on the configuration message received at 310. In some cases, UE 115-*b* may perform the measurements on or using the second configuration. In some examples, the UE 115-*b* may identify a UE beam corresponding with the configured base station beams that are being measured. Additionally, the UE 115-*b* may also determine whether the cell is detectable for a threshold time period based on a signal to noise ratio associated with the cell.

At 325, the UE 115-*b* may perform beam management to track one or more UE beams corresponding to the configured base station beams. In some cases, performing beam management may include receiving reference signals from a base station. The UE 115-*b* may measure the reference signals, and may identify a UE beam corresponding to one or more configured base station beams. In some cases, performing beam management may include transmitting or receiving one or more reports indicating a quality of the configured base station beams. For example, the UE 115-*b* may track which of the UE beams is best suited for communication with one or more of the configured base station beams of the deactivated cell. For example, the UE 115-*b* may determine which of the UE beams is best suited for communication with one or more of the configured base station beams of the deactivated cell based on the measurement performed at step 320. In some cases, the UE 115-*b* may perform the beam management while the cell is deactivated. The UE 115-*b* may additionally determine whether the cell is a known cell. For example, if the UE 115-*b* determine that a deactivated cell is detectable using one or more UE beams, the UE 115-*b* may determine that the deactivated cell is a known cell. In some cases, the UE 115-*b* may store an indication of the known cell and the corresponding UE beams used to detect the configured base station beams for the deactivated cell.

At 330, the UE 115-*b* may transmit to the base station 105-*b*, a measurement report including an indication of which of the configured base station beams are being measured. In some cases, the UE 115-*b* may receive a configuration for an active cell from the base station 105-*b*. In some cases, the active cell may include a second base station beam. The UE 115-*b* may identify that a second UE beam corresponds with the second base station beam for the active cell, and may transmit the measurement report using the second UE beam.

At 335, the UE 115-*b* may receive an activation command corresponding to the cell from the base station. For example, the UE 115-*b* may receive an activation command for the previously deactivated cell. In some examples, receiving the activation command may be included in a handover procedure or a cell activation procedure.

At 340, UE 115-*b* may communicate with the base station 105-*b*, using one or more UE beams corresponding to the known cell. As discussed above, since the UE 115-*b* was performing beam management on the cell while it was deactivated, once the cell is activated, if the cell has been determined by the UE 115-*b* as a known cell, communicating with the cell may occur with a reduced latency and/or overhead as compared to having to search for the timing of the cell upon receiving an activation command for that cell.

Figure 4:
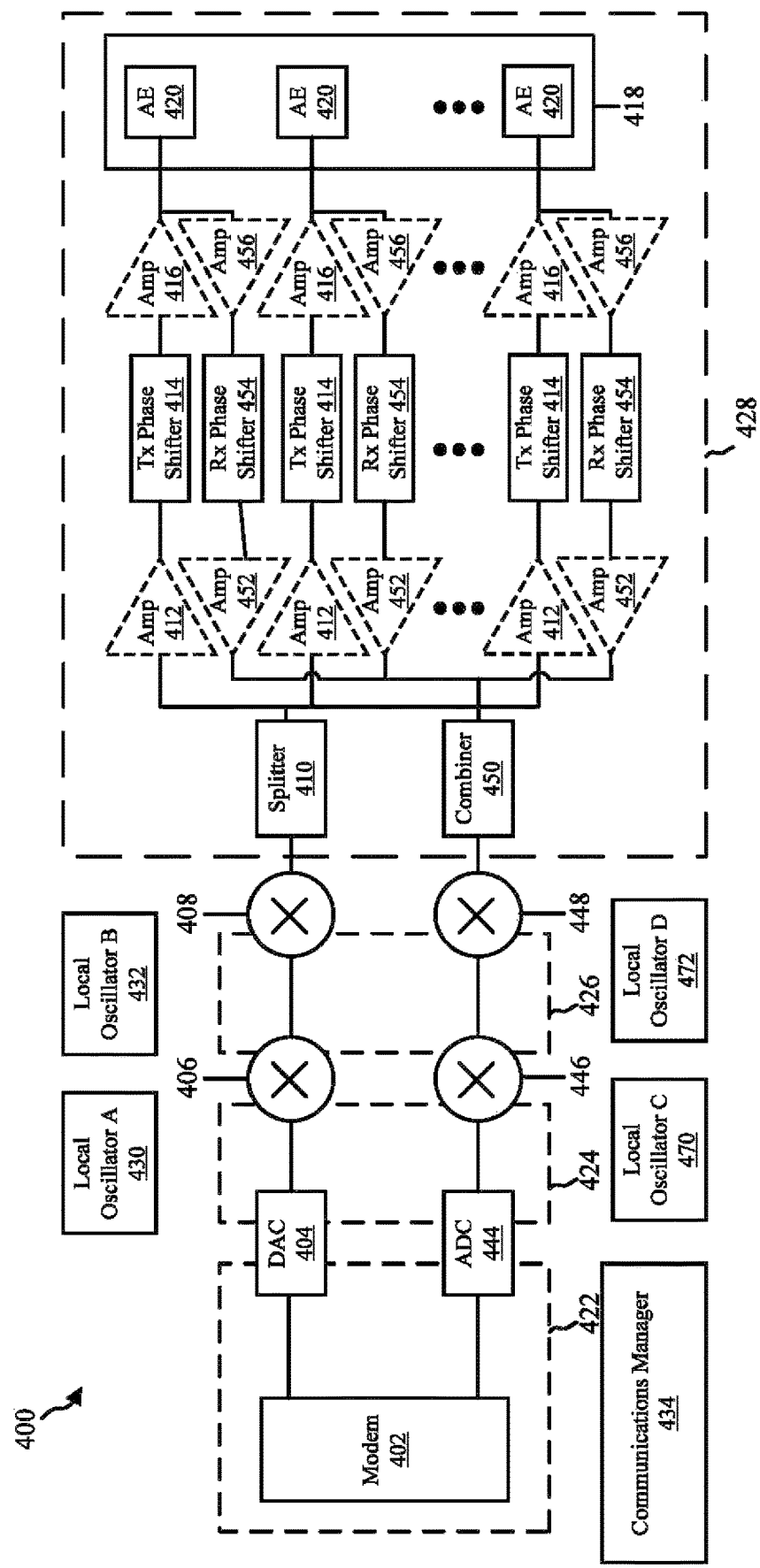
FIG. 4 illustrates an example of an architecture that supports beam management on a deactivated cell in accordance with aspects of the present disclosure.

FIG. 4 illustrates an example of an architecture 400 that supports beam management on a deactivated cell in accordance with aspects of the present disclosure. In some examples, architecture 400 may implement aspects of wireless communications systems 100 and/or 200 and/or process flow 300. In some aspects, architecture 400 may be an example of the transmitting device (e.g., a first wireless device) and/or a receiving device (e.g., a second wireless device) as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, a splitter 410, and a combiner 450. The architecture 400 also includes a plurality of first amplifiers 412, a plurality of phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital baseband signals travel or are processed, box 424 indicates a region in which analog baseband signals travel or are processed, box 426 indicates a region in which analog intermediate frequency (IF) signals travel or are processed, and box 428 indicates a region in which analog radio frequency (RF) signals travel or are processed. The architecture also includes a local oscillator A 430, a local oscillator B 432, a communications manager 434.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as one of the first amplifiers 412, or one of the phase shifters 414 corresponding to an antenna element 420. The first and second amplifiers 412, 416 are illustrated with dashed lines because one or both of them might not be necessary in some implementations. In one implementation, both the first amplifier 412 and second amplifier 416 are present. In another, neither the first amplifier 412 nor the second amplifier 416 is present. In other implementations, one of the two amplifiers 412, and 416 is present but not the other. By way of example, if the splitter 410 is an active splitter, the first amplifier 412 may not be used. By way of further example, if the phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or communications manager 434) to provide independent control of the gain for each antenna element 420. For example, the modem 402 and/or the communications manager 434 may have at least one control line connected to each of the splitter 410, first amplifiers 412, phase shifters 414, and/or second amplifiers 416 which may be used to configure a gain to provide a desired amount of gain for each component and thus each antenna element 420.

The phase shifter 414 may provide a configurable phase shift or phase offset to a corresponding RF signal to be transmitted. The phase shifter 414 could be a passive phase shifter not directly connected to a power supply. Passive phase shifters might introduce some insertion loss. The second amplifier 416 could boost the signal to compensate for the insertion loss. The phase shifter 414 could be an active phase shifter connected to a power supply such that the active phase shifter provides some amount of gain or prevents insertion loss. The settings of each of the phase shifters 414 are independent meaning that each can be set to provide a desired amount of phase shift or the same amount of phase shift or some other configuration. The modem 402 and/or the communications manager 434 may have at least one control line connected to each of the phase shifters 414 and which may be used to configure the phase shifters 414 to provide a desired amounts of phase shift or phase offset between antenna elements 420.

In the illustrated architecture 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the communications manager 434 may have at least one control line connected to each of the phase shifters 454 and which may be used to configure the phase shifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated architecture 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, e.g., decoding, de-interleaving, etc.

The architecture 400 is given by way of example only to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Further numerous alternate architectures are possible and contemplated. For example, although a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations of the UE or in different directions. Further mixers, splitters, amplifiers, phase shifters and other components may be located in different signal type areas (e.g., boxes 422, 424, 426, 428) in different implemented architectures. For example, splitting of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In one implementation of this configuration, there may be a plurality of IF-to-RF mixers (e.g., for each antenna element chain) within the second mixer 408 and the local oscillator B 432 may supply different local oscillator signals (with different phase offsets) to each IF-to-RF mixer.

The modem 402 and/or the communications manager 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the plurality of signals relative to each other.

The communications manager 434 may, when architecture 400 is configured as a UE, receive, from a transmitting device, a configuration for a cell, where the cell is deactivated and is configured with one or more base station beams. The architecture 400 configured as a UE may receive (or otherwise identify) an allocation of beam management resources for performing beam management based on the configured base station beams while the cell is deactivated. The architecture 400 configured as a UE may then perform beam management to track one or more UE beams corresponding to the configured base station beams, as discussed herein. The communications manager 434 may, when architecture 400 is configured as a base station, transmit, to a UE, a configuration for a cell, where the cell is deactivated and is configured with one or more base station beams. The communications manager 434 may additionally transmit an allocation of beam management resources for performing beam management at the UE based on the configured base station beams, and may receive, on an active cell and while the cell is deactivated, a measurement report corresponding to beam management at the UE, as discussed herein. The communications manager 434 may be located partially or fully within one or more other components of the architecture 400. For example, the communications manager 434 may be located within the modem 402 in at least one implementation.

Figure 5:
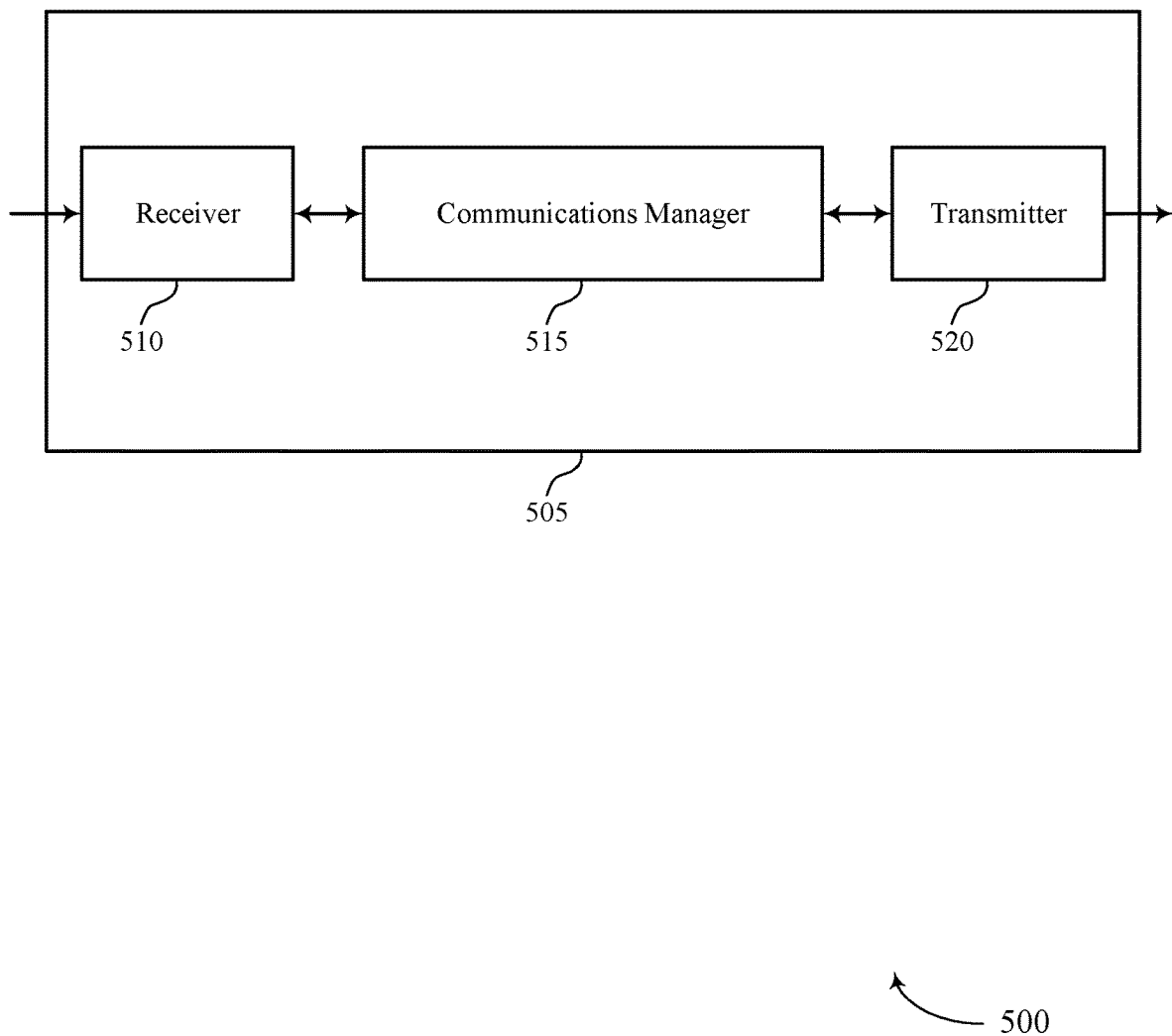
FIGS. 5 and 6 show block diagrams of devices that support beam management on a deactivated cell in accordance with aspects of the present disclosure.

FIG. 5 shows a block diagram 500 of a device 505 that supports beam management on a deactivated cell in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam management on a deactivated cell). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a configuration for a cell, where the cell is deactivated and is configured with one or more base station beams, identify an allocation of beam management resources for performing beam management based on the configured base station beams, and perform, at the UE and while the cell is deactivated, beam management to track one or more UE beams corresponding to the configured base station beams. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
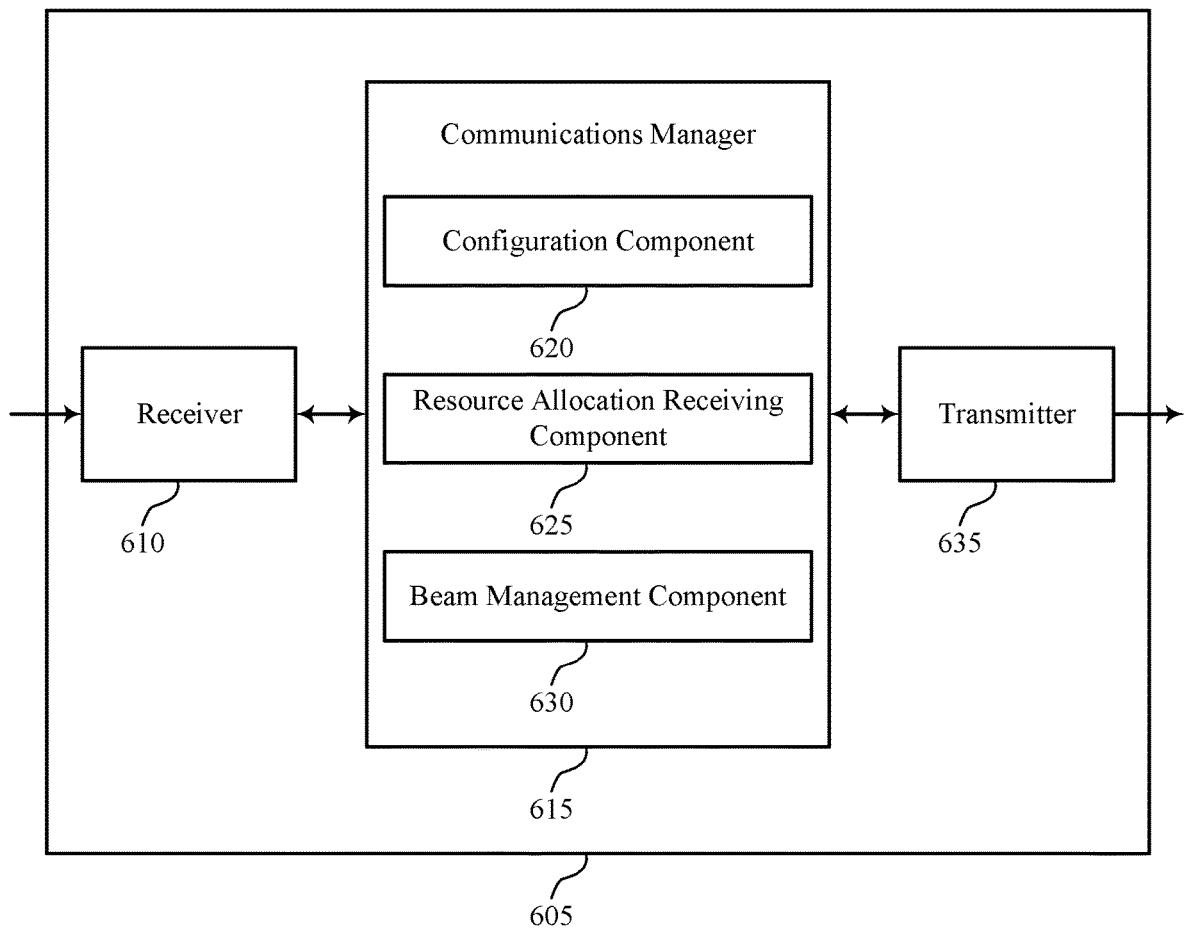

FIG. 6 shows a block diagram 600 of a device 605 that supports beam management on a deactivated cell in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to beam management on a deactivated cell). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration component 620, a resource allocation receiving component 625, and a beam management component 630. The communications manager 615 may be an example of aspects of the communications manager 810 described herein.

The configuration component 620 may receive, from a base station, a configuration for a cell, where the cell is deactivated and is configured with one or more base station beams. The resource allocation receiving component 625 may identify an allocation of beam management resources for performing beam management based on the configured base station beams. The beam management component 630 may perform, at the UE and while the cell is deactivated, beam management to track one or more UE beams corresponding to the configured base station beams.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
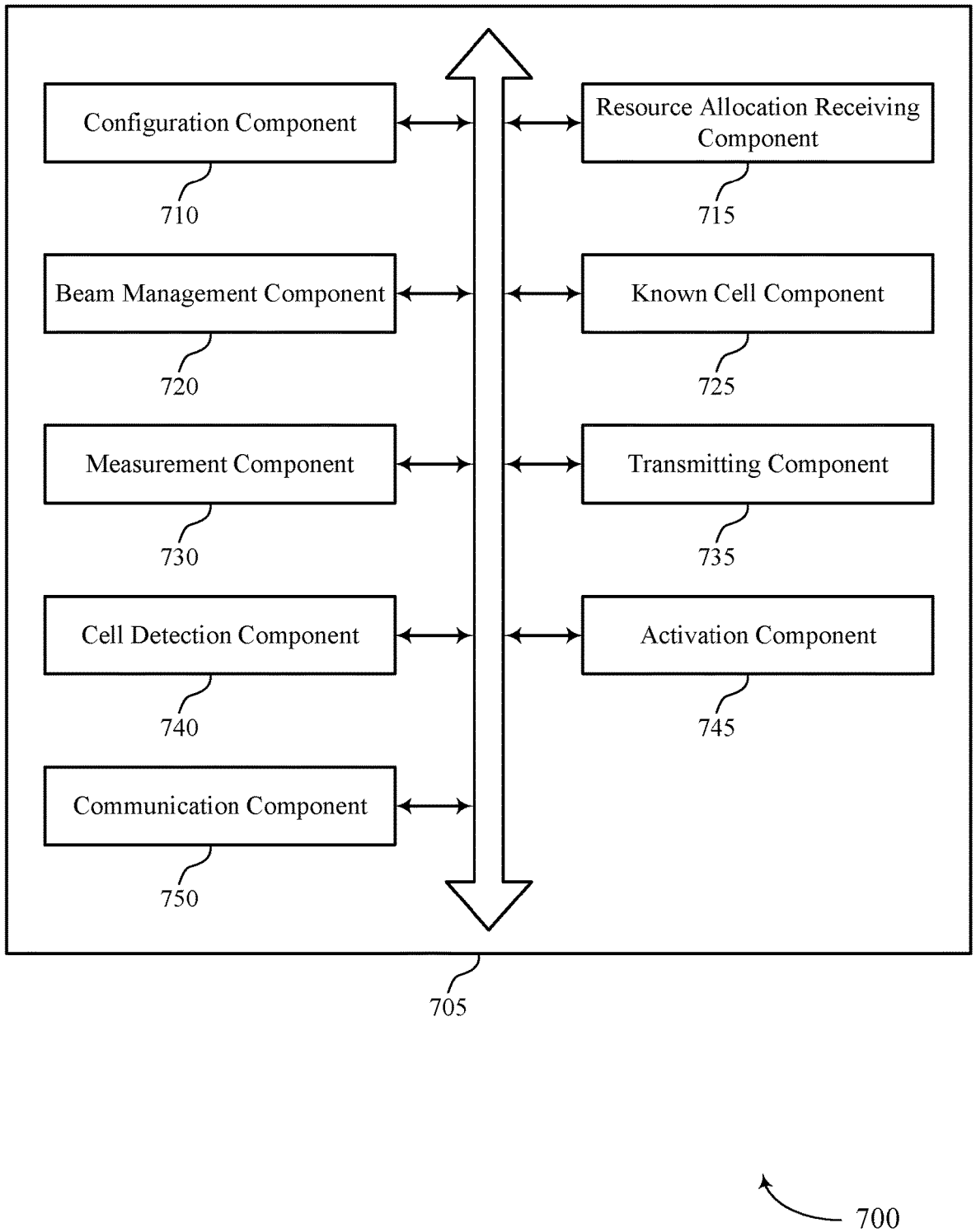
FIG. 7 shows a block diagram of a communications manager that supports beam management on a deactivated cell in accordance with aspects of the present disclosure.

FIG. 7 shows a block diagram 700 of a communications manager 705 that supports beam management on a deactivated cell in accordance with aspects of the present disclosure. The communications manager 705 may be an example of aspects of a communications manager 515, a communications manager 615, or a communications manager 810 described herein. The communications manager 705 may include a configuration component 710, a resource allocation receiving component 715, a beam management component 720, a known cell component 725, a measurement component 730, a transmitting component 735, a cell detection component 740, an activation component 745, and a communication component 750. Each of these modules may communicate, directly or indirectly, with one another (e.g., via one or more buses).

The configuration component 710 may receive, from a base station, a configuration for a cell, where the cell is deactivated and is configured with one or more base station beams. In some examples, the configuration component 710 may receive a second configuration for a first base station beam of the configured base station beams, where performing beam management is based on the second configuration or the allocation of beam management resources.

In some examples, receiving, from the base station, a configuration for an active cell, where the active cell includes a second base station beam. In some examples, the configuration component 710 may receive an indication that the cell is initially deactivated, where the indication is received with receiving the configuration for the cell or prior to receiving the configuration for the cell. In some cases, the cell is a secondary cell.

In some cases, the UE and the base station are configured to communicate using millimeter wave frequencies. The resource allocation receiving component 715 may identify an allocation of beam management resources for performing beam management based on the configured base station beams. In some cases, the beam management resources include resources for transmitting or receiving one or more reports indicating a quality of the configured base station beams.

The beam management component 720 may perform, at the UE and while the cell is deactivated, beam management to track one or more UE beams corresponding to the configured base station beams. In some examples, the beam management component 720 may store an indication of a UE beam used to detect the configured base station beams for the cell.

The known cell component 725 may determine whether the cell is a known cell based on performing beam management. The measurement component 730 may periodically measure the configured base station beams at the UE by using the one or more UE beams, where the measuring is based on the second configuration or the allocation of beam management resources. In some examples, the measurement component 730 may identify a UE beam corresponding with the configured base station beams that are being measured. In some examples, identifying that a second UE beam corresponds with the second base station beam for the active cell, where transmitting the measurement report includes transmitting the measurement report using the second UE beam.

The transmitting component 735 may transmit a measurement report including an indication of which of the configured base station beams are being measured. The cell detection component 740 may determine whether the cell is detectable for a threshold time period based on a signal to noise ratio associated with the cell, where determining whether the cell as the known cell is based on transmitting the measurement report and the cell being detectable for the threshold time period.

The activation component 745 may receive, from the base station, an activation command corresponding to the cell. In some examples, the activation component 745 may receive the activation command is included in a handover procedure or a cell activation procedure. The communication component 750 may communicate, with the base station, based on the stored indication of the UE beam.

Figure 8:
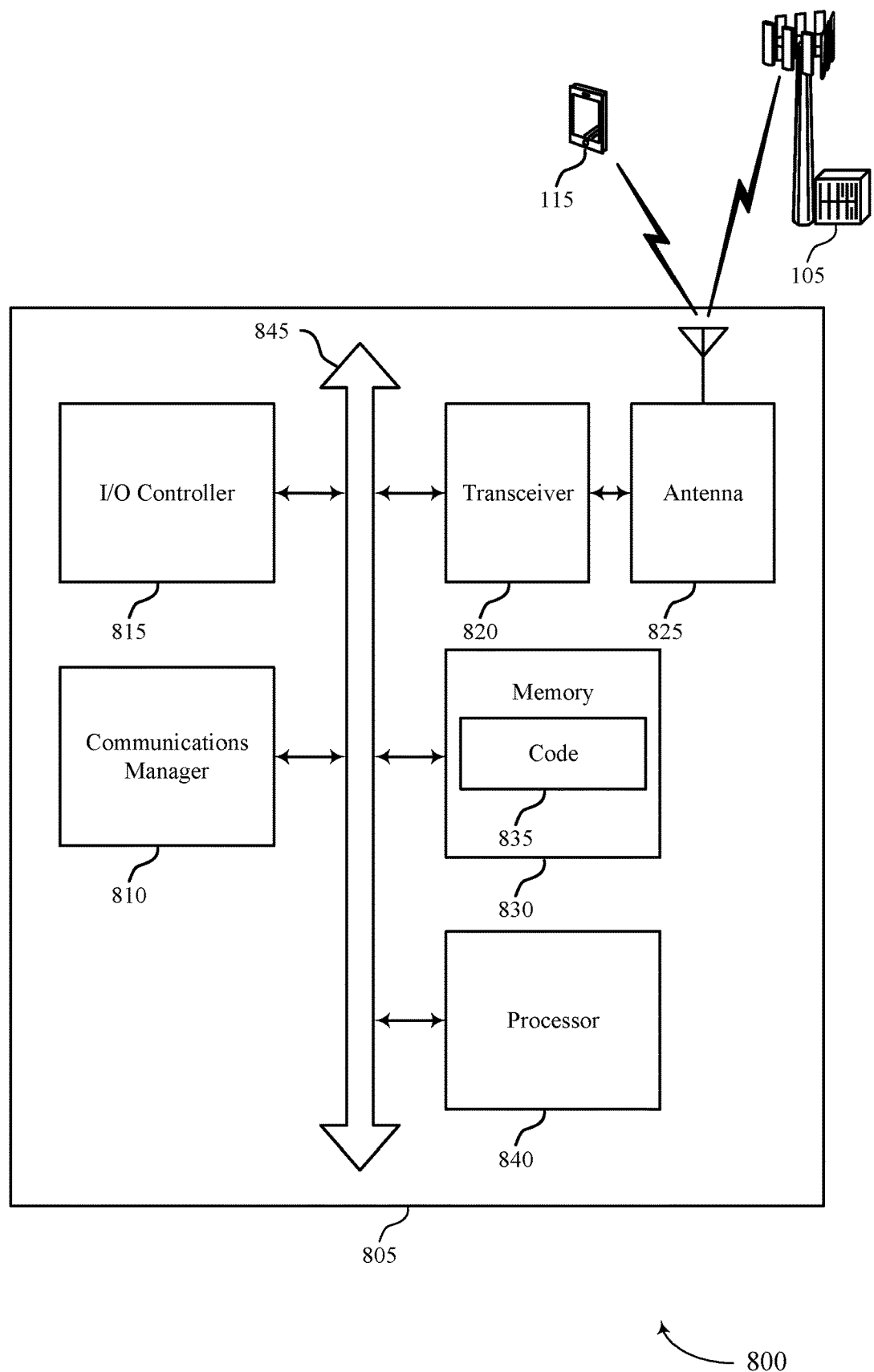
FIG. 8 shows a diagram of a system including a device that supports beam management on a deactivated cell in accordance with aspects of the present disclosure.

FIG. 8 shows a diagram of a system 800 including a device 805 that supports beam management on a deactivated cell in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a configuration for a cell, where the cell is deactivated and is configured with one or more base station beams, identify an allocation of beam management resources for performing beam management based on the configured base station beams, and perform, at the UE and while the cell is deactivated, beam management to track one or more UE beams corresponding to the configured base station beams.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/basic output (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam management on a deactivated cell).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
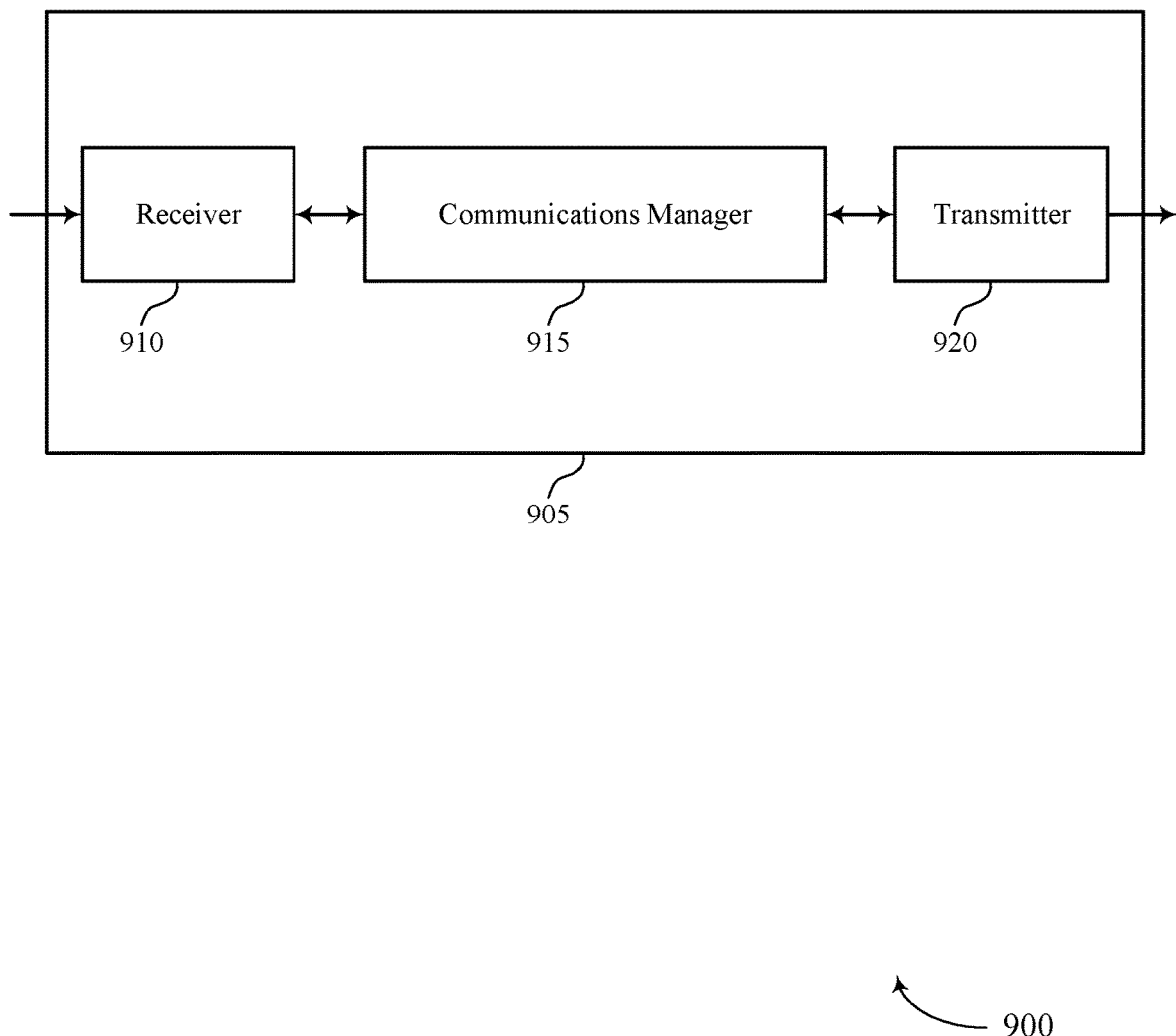
FIGS. 9 and 10 show block diagrams of devices that support beam management on a deactivated cell in accordance with aspects of the present disclosure.

FIG. 9 shows a block diagram 900 of a device 905 that supports beam management on a deactivated cell in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam management on a deactivated cell). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration for a cell, where the cell is deactivated and is configured with one or more base station beams, transmit an allocation of beam management resources for performing beam management at the UE based on the configured base station beams, and receive, on an active cell and while the cell is deactivated, a measurement report corresponding to beam management at the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
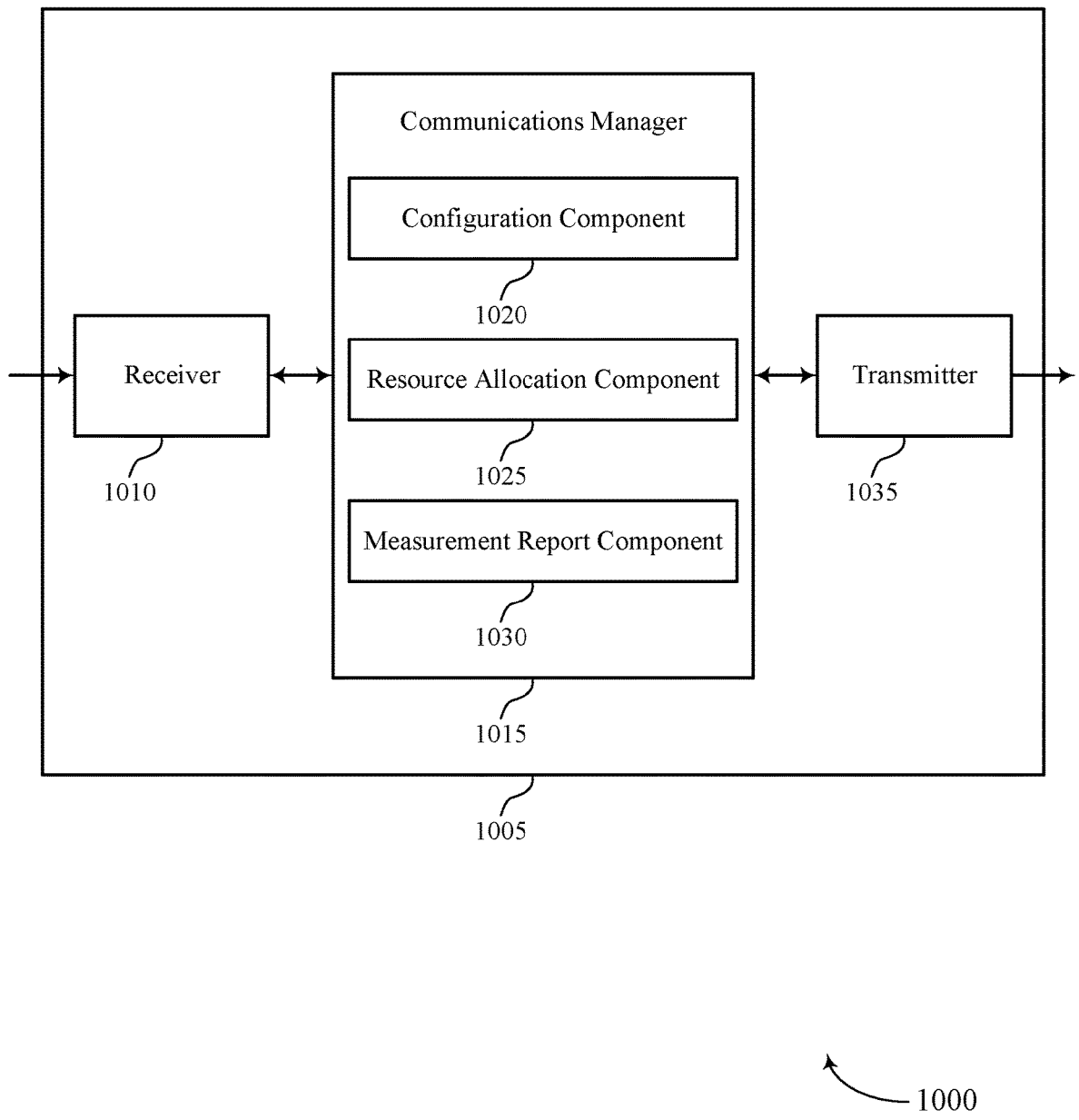

FIG. 10 shows a block diagram 1000 of a device 1005 that supports beam management on a deactivated cell in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to beam management on a deactivated cell). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020, a resource allocation component 1025, and a measurement report component 1030. The communications manager 1015 may be an example of aspects of the communications manager 1210 described herein.

The configuration component 1020 may transmit, to a UE, a configuration for a cell, where the cell is deactivated and is configured with one or more base station beams. The resource allocation component 1025 may transmit an allocation of beam management resources for performing beam management at the UE based on the configured base station beams. The measurement report component 1030 may receive, on an active cell and while the cell is deactivated, a measurement report corresponding to beam management at the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
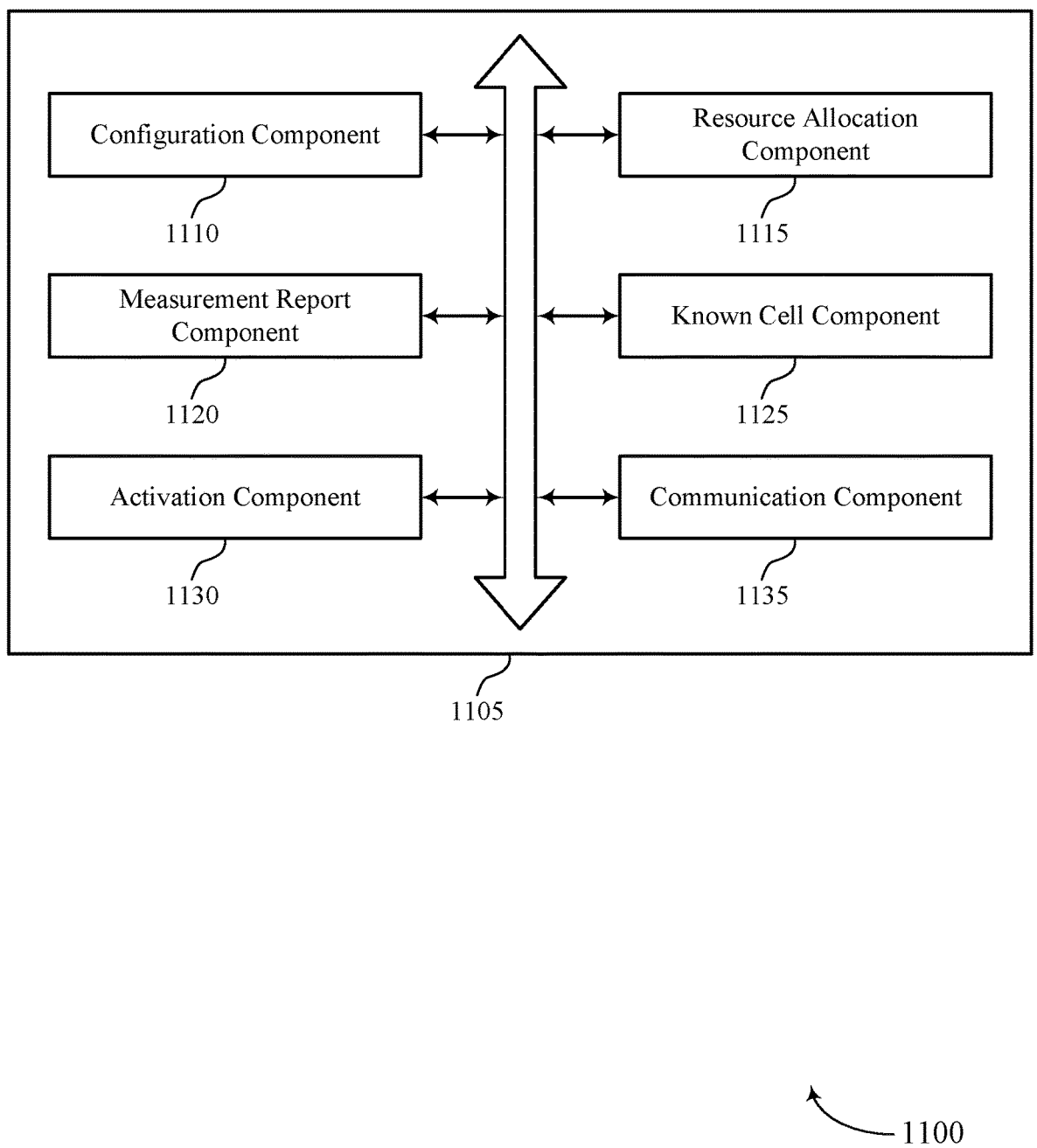
FIG. 11 shows a block diagram of a communications manager that supports beam management on a deactivated cell in accordance with aspects of the present disclosure.

FIG. 11 shows a block diagram 1100 of a communications manager 1105 that supports beam management on a deactivated cell in accordance with aspects of the present disclosure. The communications manager 1105 may be an example of aspects of a communications manager 915, a communications manager 1015, or a communications manager 1210 described herein. The communications manager 1105 may include a configuration component 1110, a resource allocation component 1115, a measurement report component 1120, a known cell component 1125, an activation component 1130, and a communication component 1135. Each of these modules may communicate, directly or indirectly, with one another (e.g., via one or more buses).

The configuration component 1110 may transmit, to a UE, a configuration for a cell, where the cell is deactivated and is configured with one or more base station beams. In some examples, the configuration component 1110 may transmit a second configuration for a first base station beam of the configured base station beams, where beam management is based on the second configuration or the allocation of beam management resources. In some examples, the configuration component 1110 may transmit, to the UE, a configuration for the active cell, where the active cell includes a second base station beam, and where receiving the measurement report includes receiving the measurement report using a second UE beam that corresponds with the second base station beam for the active cell.

In some examples, the configuration component 1110 may transmit an indication that the cell is initially deactivated, where the indication is transmitted with the configuration for the cell or prior to transmitting the configuration for the cell. In some cases, the cell is determined as a known cell at the UE based on beam management. In some cases, the cell is a secondary cell. In some cases, the UE and the base station are configured to communicate using millimeter wave frequencies.

The resource allocation component 1115 may transmit an allocation of beam management resources for performing beam management at the UE based on the configured base station beams. In some cases, the beam management resources include resources for transmitting or receiving one or more reports indicating a quality of the configured base station beams.

The measurement report component 1120 may receive, on an active cell and while the cell is deactivated, a measurement report corresponding to beam management at the UE. In some examples, the measurement report component 1120 may receive the measurement report including an indication of which of the configured base station beams are being measured.

The known cell component 1125 may identify that the cell is determined as the known cell based on receiving the measurement report. The activation component 1130 may transmit, to the UE, an activation command corresponding to the cell. In some examples, the activation component 1130 may transmit the activation command is included in a handover procedure or a cell activation procedure. The communication component 1135 may communicate, with the UE, based on an indication of a known UE beam that is stored at the UE.

Figure 12:
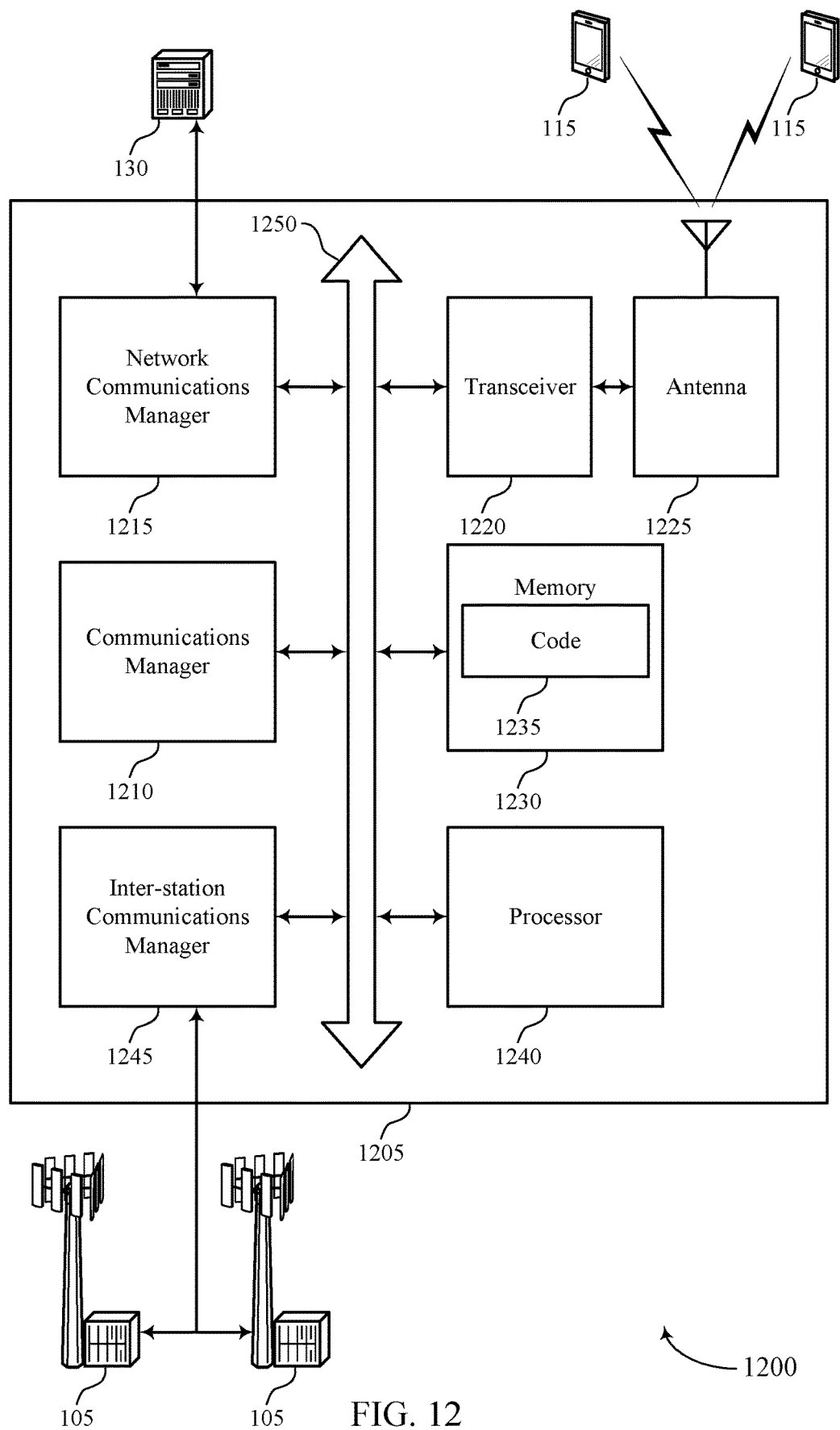
FIG. 12 shows a diagram of a system including a device that supports beam management on a deactivated cell in accordance with aspects of the present disclosure.

FIG. 12 shows a diagram of a system 1200 including a device 1205 that supports beam management on a deactivated cell in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration for a cell, where the cell is deactivated and is configured with one or more base station beams, transmit an allocation of beam management resources for performing beam management at the UE based on the configured base station beams, and receive, on an active cell and while the cell is deactivated, a measurement report corresponding to beam management at the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam management on a deactivated cell).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
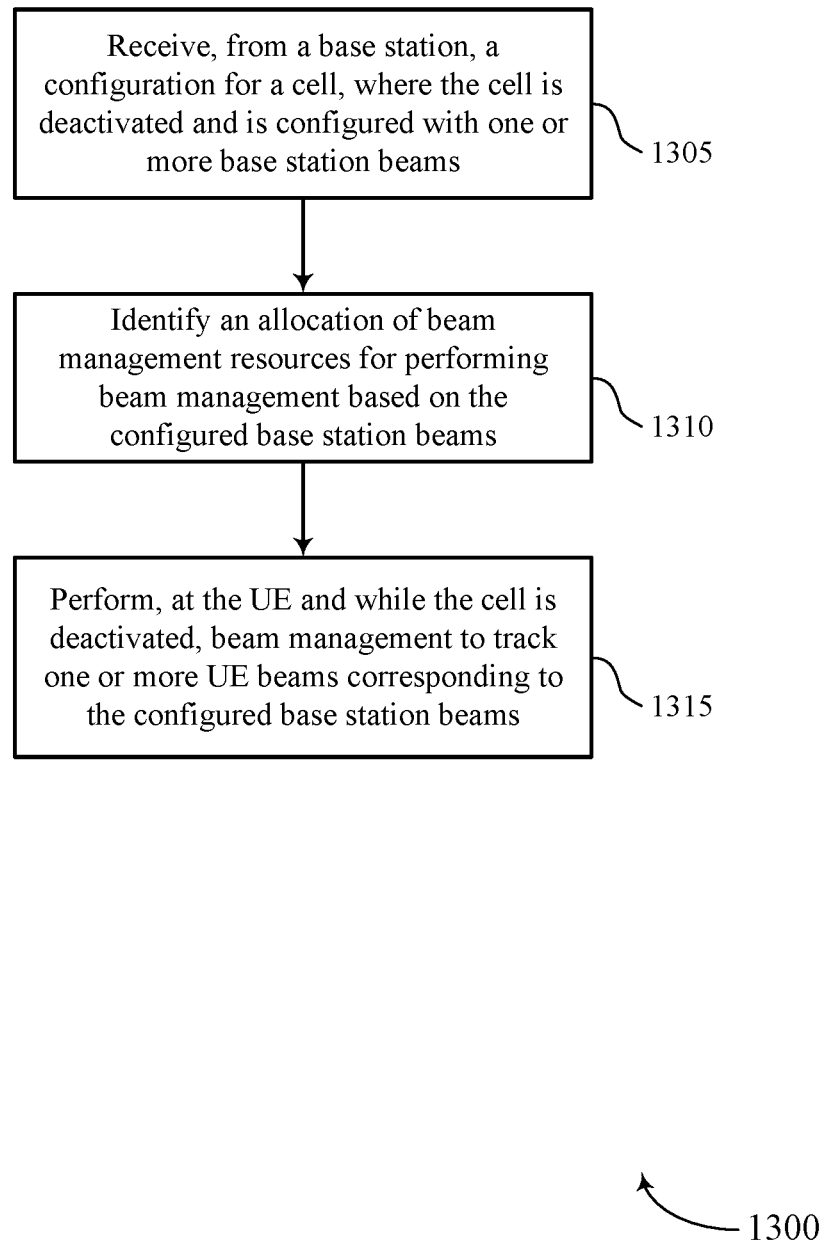
FIGS. 13 through 16 show flowcharts illustrating methods that support beam management on a deactivated cell in accordance with aspects of the present disclosure.

FIG. 13 shows a flowchart illustrating a method 1300 that supports beam management on a deactivated cell in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration for a cell, where the cell is deactivated and is configured with one or more base station beams. The operations of 1305 may be performed according to the methods described herein. In some examples, aspects of the operations of 1305 may be performed by a configuration component as described with reference to FIGS. 5 through 8.

At 1310, the UE may identify an allocation of beam management resources for performing beam management based on the configured base station beams. The operations of 1310 may be performed according to the methods described herein. In some examples, aspects of the operations of 1310 may be performed by a resource allocation receiving component as described with reference to FIGS. 5 through 8.

At 1315, the UE may perform, at the UE and while the cell is deactivated, beam management to track one or more UE beams corresponding to the configured base station beams. The operations of 1315 may be performed according to the methods described herein. In some examples, aspects of the operations of 1315 may be performed by a beam management component as described with reference to FIGS. 5 through 8.

Figure 14:
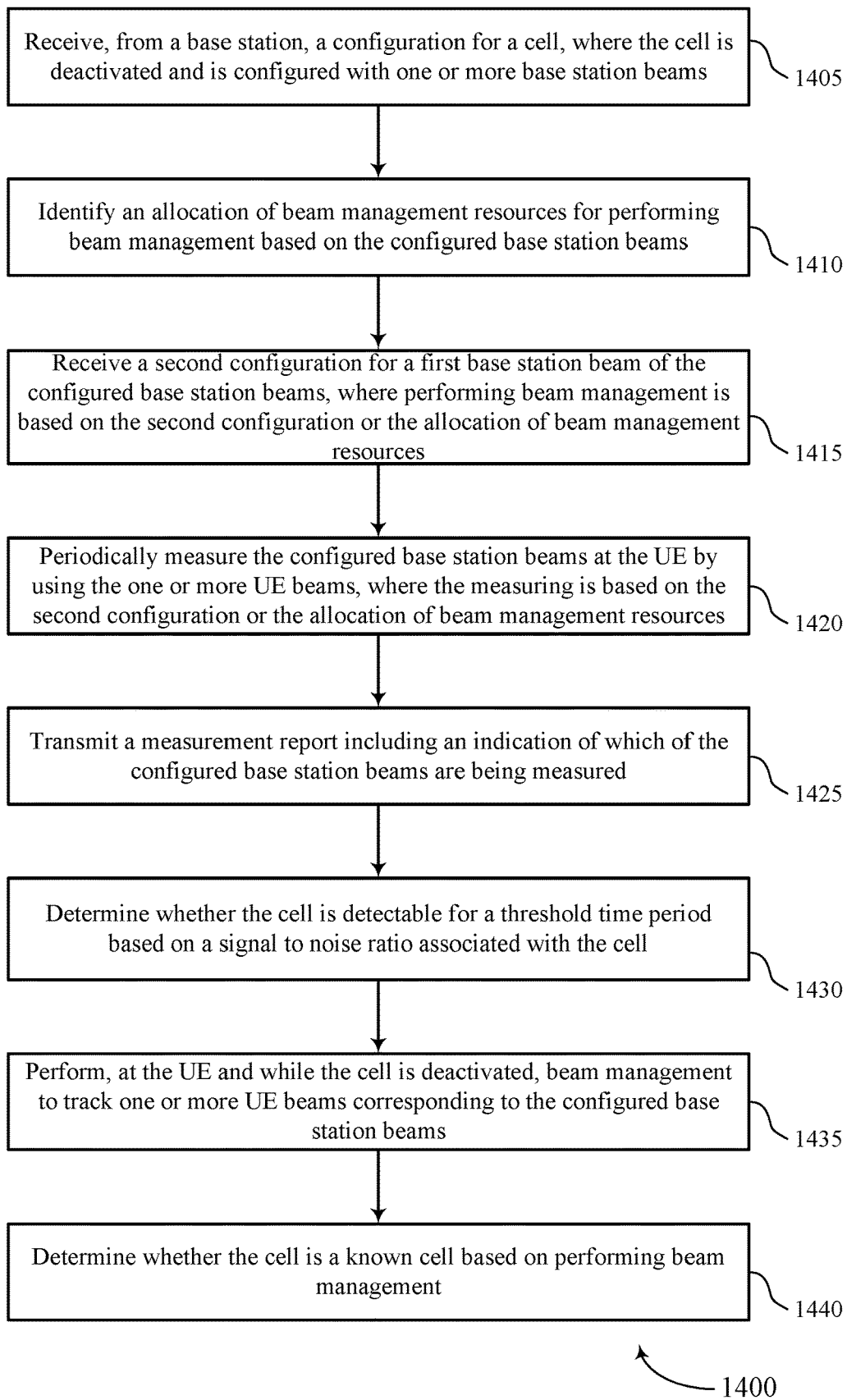

FIG. 14 shows a flowchart illustrating a method 1400 that supports beam management on a deactivated cell in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration for a cell, where the cell is deactivated and is configured with one or more base station beams. The operations of 1405 may be performed according to the methods described herein. In some examples, aspects of the operations of 1405 may be performed by a configuration component as described with reference to FIGS. 5 through 8.

At 1410, the UE may identify an allocation of beam management resources for performing beam management based on the configured base station beams. The operations of 1410 may be performed according to the methods described herein. In some examples, aspects of the operations of 1410 may be performed by a resource allocation receiving component as described with reference to FIGS. 5 through 8.

At 1415, the UE may receive a second configuration for a first base station beam of the configured base station beams, where performing beam management is based on the second configuration or the allocation of beam management resources. The operations of 1415 may be performed according to the methods described herein. In some examples, aspects of the operations of 1415 may be performed by a configuration component as described with reference to FIGS. 5 through 8.

At 1420, the UE may periodically measure the configured base station beams at the UE by using the one or more UE beams, where the measuring is based on the second configuration or the allocation of beam management resources. The operations of 1420 may be performed according to the methods described herein. In some examples, aspects of the operations of 1420 may be performed by a measurement component as described with reference to FIGS. 5 through 8.

At 1425, the UE may transmit a measurement report including an indication of which of the configured base station beams are being measured. The operations of 1425 may be performed according to the methods described herein. In some examples, aspects of the operations of 1425 may be performed by a transmitting component as described with reference to FIGS. 5 through 8.

At 1430, the UE may determine whether the cell is detectable for a threshold time period based on a signal to noise ratio associated with the cell. In some cases, determining whether the cell as the known cell is based on transmitting the measurement report and the cell being detectable for the threshold time period. The operations of 1430 may be performed according to the methods described herein. In some examples, aspects of the operations of 1430 may be performed by a cell detection component as described with reference to FIGS. 5 through 8.

At 1435, the UE may perform, at the UE and while the cell is deactivated, beam management to track one or more UE beams corresponding to the configured base station beams. The operations of 1435 may be performed according to the methods described herein. In some examples, aspects of the operations of 1435 may be performed by a beam management component as described with reference to FIGS. 5 through 8.

At 1440, the UE may determine whether the cell is a known cell based on performing beam management. The operations of 1440 may be performed according to the methods described herein. In some examples, aspects of the operations of 1440 may be performed by a known cell component as described with reference to FIGS. 5 through 8.

Figure 15:
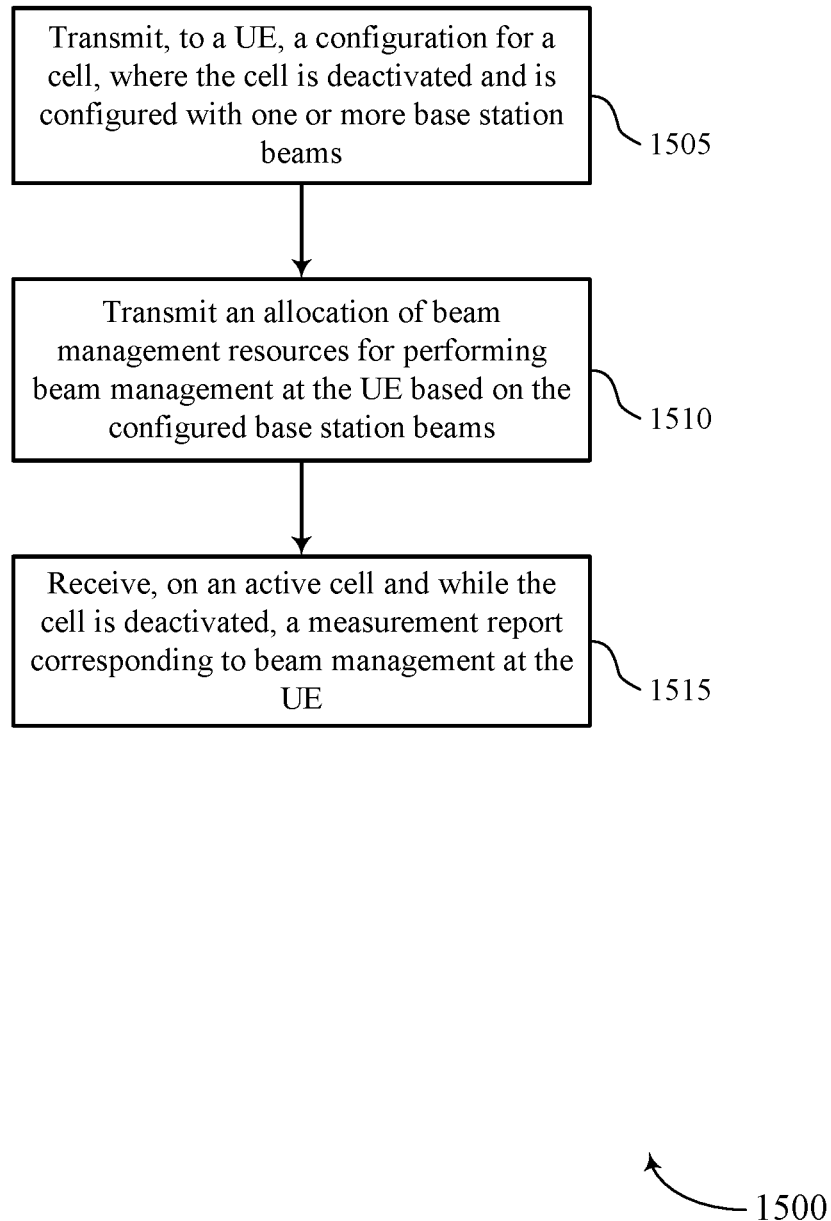

FIG. 15 shows a flowchart illustrating a method 1500 that supports beam management on a deactivated cell in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a configuration for a cell, where the cell is deactivated and is configured with one or more base station beams. The operations of 1505 may be performed according to the methods described herein. In some examples, aspects of the operations of 1505 may be performed by a configuration component as described with reference to FIGS. 9 through 12.

At 1510, the base station may transmit an allocation of beam management resources for performing beam management at the UE based on the configured base station beams. The operations of 1510 may be performed according to the methods described herein. In some examples, aspects of the operations of 1510 may be performed by a resource allocation component as described with reference to FIGS. 9 through 12.

At 1515, the base station may receive, on an active cell and while the cell is deactivated, a measurement report corresponding to beam management at the UE. The operations of 1515 may be performed according to the methods described herein. In some examples, aspects of the operations of 1515 may be performed by a measurement report component as described with reference to FIGS. 9 through 12.

Figure 16:
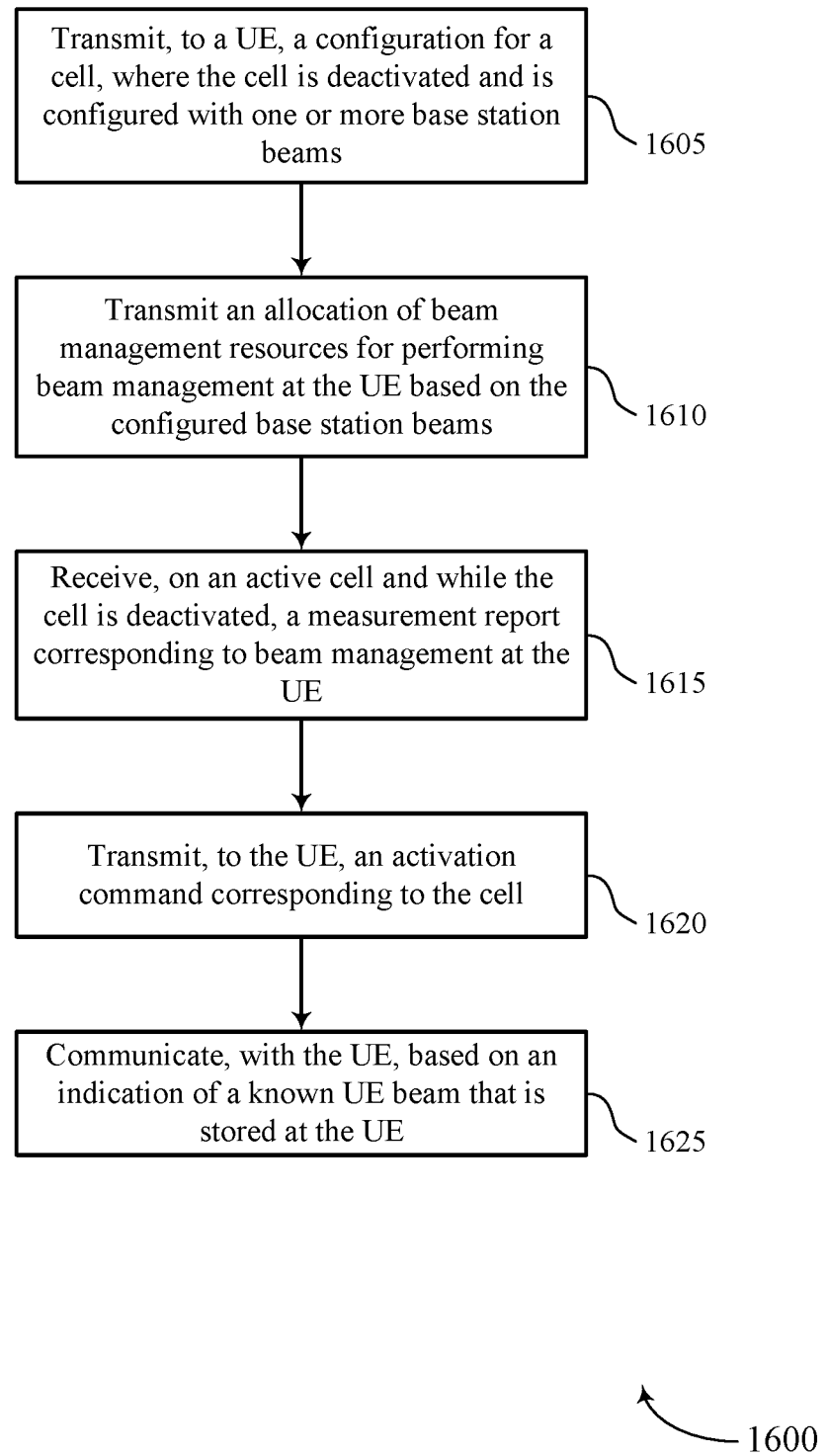

FIG. 16 shows a flowchart illustrating a method 1600 that supports beam management on a deactivated cell in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration for a cell, where the cell is deactivated and is configured with one or more base station beams. The operations of 1605 may be performed according to the methods described herein. In some examples, aspects of the operations of 1605 may be performed by a configuration component as described with reference to FIGS. 9 through 12.

At 1610, the base station may transmit an allocation of beam management resources for performing beam management at the UE based on the configured base station beams. The operations of 1610 may be performed according to the methods described herein. In some examples, aspects of the operations of 1610 may be performed by a resource allocation component as described with reference to FIGS. 9 through 12.

At 1615, the base station may receive, on an active cell and while the cell is deactivated, a measurement report corresponding to beam management at the UE. The operations of 1615 may be performed according to the methods described herein. In some examples, aspects of the operations of 1615 may be performed by a measurement report component as described with reference to FIGS. 9 through 12.

At 1620, the base station may transmit, to the UE, an activation command corresponding to the cell. The operations of 1620 may be performed according to the methods described herein. In some examples, aspects of the operations of 1620 may be performed by an activation component as described with reference to FIGS. 9 through 12.

At 1625, the base station may communicate, with the UE, based on an indication of a known UE beam that is stored at the UE. The operations of 1625 may be performed according to the methods described herein. In some examples, aspects of the operations of 1625 may be performed by a communication component as described with reference to FIGS. 9 through 12.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method for wireless communication at a UE that includes receiving, from a base station, a configuration for a cell, where the cell is deactivated and is configured with one or more base station beams, identifying an allocation of beam management resources for performing beam management based on the configured base station beams, and performing, at the UE and while the cell is deactivated, beam management to track one or more UE beams corresponding to the configured base station beams.

In Example 2, the method of Example 1 further includes determining whether the cell is a known cell based at least in part on performing beam management.

In Example 3, the method of any of Examples 1-2 further includes receiving a second configuration for a first base station beam of the configured base station beams, where performing beam management is based at least in part on the second configuration or the allocation of beam management resources.

In Example 4, the method of any of Examples 1-3 where performing beam management further includes periodically measuring the configured base station beams at the UE by using the one or more UE beams, where the measuring is based at least in part on the second configuration or the allocation of beam management resources, and transmitting a measurement report including an indication of which of the configured base station beams are being measured.

In Example 5, the method of any of Examples 1-4 further includes determining whether the cell is detectable for a threshold time period based at least in part on a signal to noise ratio associated with the cell, where determining whether the cell as the known cell is based at least in part on transmitting the measurement report and the cell being detectable for the threshold time period.

In Example 6, the method of any of Examples 1-5 further includes identifying a UE beam corresponding with the configured base station beams that are being measured.

In Example 7, the method of any of Examples 1-6 further includes receiving, from the base station, a configuration for an active cell, where the active cell includes a second base station beam, and identifying that a second UE beam corresponds with the second base station beam for the active cell, where transmitting the measurement report includes transmitting the measurement report using the second UE beam.

In Example 8, the method of any of Examples 1-7 further includes that the beam management resources include resources for transmitting or receiving one or more reports indicating a quality of the configured base station beams.

In Example 9, the method of any of Examples 1-8 further includes storing an indication of a UE beam used to detect the configured base station beams for the cell.

In Example 10, the method of any of Examples 1-9 further includes receiving, from the base station, an activation command corresponding to the cell, and communicating, with the base station, based at least in part on the stored indication of the UE beam.

In Example 11, the method of any of Examples 1-10 further includes that receiving the activation command is included in a handover procedure or a cell activation procedure.

In Example 12, the method of any of Examples 1-11 further includes receiving an indication that the cell is initially deactivated, where the indication is received with receiving the configuration for the cell or prior to receiving the configuration for the cell.

In Example 13, the method of any of Examples 1-12 further includes that the cell is a secondary cell.

In Example 14, the method of any of Examples 1-13 further includes that the UE and the base station are configured to communicate using mmW frequencies.

Example 15 is a method for wireless communication at a base station that includes transmitting, to a UE, a configuration for a cell, where the cell is deactivated and is configured with one or more base station beams, transmitting an allocation of beam management resources for performing beam management at the UE based at least in part on the configured base station beams, and receiving, on an active cell and while the cell is deactivated, a measurement report corresponding to beam management at the UE.

In Example 16, the method of Example 15 further includes that the cell is determined as a known cell at the UE based at least in part on beam management.

In Example 17, the method of any of Examples 15-16 further includes transmitting a second configuration for a first base station beam of the configured base station beams, where beam management is based at least in part on the second configuration or the allocation of beam management resources.

In Example 18, the method of any of Examples 15-17 further includes receiving the measurement report including an indication of which of the configured base station beams are being measured.

In Example 19, the method of any of Examples 15-18 further includes identifying that the cell is determined as the known cell based at least in part on receiving the measurement report.

In Example 20, the method of any of Examples 15-19 further includes transmitting, to the UE, a configuration for the active cell, where the active cell includes a second base station beam, where receiving the measurement report includes receiving the measurement report using a second UE beam that corresponds with the second base station beam for the active cell.

In Example 21, the method of any of Examples 15-20 further includes that the beam management resources include resources for transmitting or receiving one or more reports indicating a quality of the configured base station beams.

In Example 22, the method of any of Examples 15-21 further includes transmitting, to the UE, an activation command corresponding to the cell, and communicating, with the UE, based at least in part on an indication of a known UE beam that is stored at the UE.

In Example 23, the method of any of Examples 15-22 further includes transmitting the activation command is included in a handover procedure or a cell activation procedure.

In Example 24, the method of any of Examples 15-23 further includes transmitting an indication that the cell is initially deactivated, where the indication is transmitted with the configuration for the cell or prior to transmitting the configuration for the cell.

In Example 25, the method of any of Examples 15-24 further includes that the cell is a secondary cell.

In Example 26, the method of any of Examples 15-25 further includes that the UE and the base station are configured to communicate using mmW frequencies.

It should be noted that the methods described herein describe possible implementations, and that the operations and the steps may be rearranged or otherwise modified and that other implementations are possible. Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration for a cell, wherein the cell is deactivated by the base station and is configured with one or more base station beams;
   identifying an allocation of beam management resources for performing beam management based on the configured one or more base station beams; and
   performing, at the UE and while the cell is deactivated, the beam management to track one or more UE beams corresponding to the configured one or more base station beams of the deactivated cell.

2. The method of claim 1, further comprising:
   determining whether the cell is a known cell based at least in part on performing the beam management.

3. The method of claim 2, further comprising:
   receiving a second configuration for a first base station beam of the configured one or more base station beams, wherein performing the beam management is based at least in part on the second configuration or the allocation of the beam management resources.

4. The method of claim 3, wherein performing the beam management further comprises:
   periodically measuring the configured one or more base station beams at the UE by using the one or more UE beams, wherein the measuring is based at least in part on the second configuration or the allocation of the beam management resources; and
   transmitting a measurement report including an indication of which of the configured one or more base station beams are being measured.

5. The method of claim 4, further comprising:
   determining whether the cell is detectable for a threshold time period based at least in part on a signal to noise ratio associated with the cell, wherein determining whether the cell as the known cell is based at least in part on transmitting the measurement report and the cell being detectable for the threshold time period.

6. The method of claim 4, further comprising:
   identifying a UE beam corresponding with the configured one or more base station beams that are being measured.

7. The method of claim 4, further comprising:
   receiving, from the base station, a configuration for an active cell, wherein the active cell comprises a second base station beam; and
   identifying that a second UE beam corresponds with the second base station beam for the active cell, wherein transmitting the measurement report comprises transmitting the measurement report using the second UE beam.

8. The method of claim 1, wherein the beam management resources comprise resources for transmitting or receiving one or more reports indicating a quality of the configured one or more base station beams.

9. The method of claim 1, further comprising:
   storing an indication of a UE beam used to detect the configured one or more base station beams for the cell.

10. The method of claim 9, further comprising:
    receiving, from the base station, an activation command corresponding to the cell; and
    communicating, with the base station, based at least in part on the stored indication of the UE beam.

11. The method of claim 10, wherein:
    receiving the activation command is included in a handover procedure or a cell activation procedure.

12. The method of claim 1, further comprising:
    receiving an indication that the cell is initially deactivated, wherein the indication is received with receiving the configuration for the cell or prior to receiving the configuration for the cell.

13. The method of claim 1, wherein the cell is a secondary cell.

14. The method of claim 1, wherein the UE and the base station are configured to communicate using millimeter wave frequencies.

15. A method for wireless communication at a base station, comprising:
    transmitting, to a user equipment (UE), a configuration for a cell, wherein the cell is deactivated by the base station and is configured with one or more base station beams;
    transmitting an allocation of beam management resources for performing beam management at the UE based at least in part on the configured one or more base station beams of the deactivated cell; and
    receiving, on an active cell and while the cell is deactivated, a measurement report corresponding to the beam management at the UE.

16. The method of claim 15, wherein the cell is determined as a known cell at the UE based at least in part on the beam management.

17. The method of claim 16, further comprising:
    transmitting a second configuration for a first base station beam of the configured one or more base station beams, wherein the beam management is based at least in part on the second configuration or the allocation of the beam management resources.

18. The method of claim 17, wherein receiving the measurement report further comprises:
receiving the measurement report including an indication of which of the configured one or more base station beams are being measured.

19. The method of claim 18, further comprising:
identifying that the cell is determined as the known cell based at least in part on receiving the measurement report.

20. The method of claim 18, further comprising:
transmitting, to the UE, a configuration for the active cell, wherein the active cell comprises a second base station beam, wherein receiving the measurement report comprises receiving the measurement report using a second UE beam that corresponds with the second base station beam for the active cell.

21. The method of claim 15, wherein the beam management resources comprise resources for transmitting or receiving one or more reports indicating a quality of the configured one or more base station beams.

22. The method of claim 15, further comprising:
transmitting, to the UE, an activation command corresponding to the cell; and
communicating, with the UE, based at least in part on an indication of a known UE beam that is stored at the UE.

23. The method of claim 22, wherein:
transmitting the activation command is included in a handover procedure or a cell activation procedure.

24. The method of claim 15, further comprising:
transmitting an indication that the cell is initially deactivated, wherein the indication is transmitted with the configuration for the cell or prior to transmitting the configuration for the cell.

25. The method of claim 15, wherein the cell is a secondary cell.

26. The method of claim 15, wherein the UE and the base station are configured to communicate using millimeter wave frequencies.

27. An apparatus for wireless communication at a user equipment (UE), comprising: a processor, memory in electronic communication with the processor; and instructions stored in the memory and executable by the processor to cause the apparatus to:
receive, from a base station, a configuration for a cell, wherein the cell is deactivated by the base station and is configured with one or more base station beams;
identify an allocation of beam management resources for performing beam management based on the configured one or more base station beams; and
perform, at the UE and while the cell is deactivated, the beam management to track one or more UE beams corresponding to the configured one or more base station beams of the deactivated cell.

28. The apparatus of claim 27, wherein the instructions are further executable by the processor to cause the apparatus to:
determine whether the cell is a known cell based at least in part on performing the beam management.

29. An apparatus for wireless communication at a base station, comprising:
a processor,
memory in electronic communication with the processor; and
instructions stored in the memory and executable by the processor to cause the apparatus to:
transmit, to a user equipment (UE), a configuration for a cell, wherein the cell is deactivated by the base station and is configured with one or more base station beams;
transmit an allocation of beam management resources for performing beam management at the UE based at least in part on the configured one or more base station beams of the deactivated cell; and
receive, on an active cell and while the cell is deactivated, a measurement report corresponding to the beam management at the UE.

30. The apparatus of claim 29, wherein the cell is determined as a known cell at the UE based at least in part on the beam management.

* * * * *